(12) United States Patent
Eleftheriou et al.

(10) Patent No.: US 7,739,866 B2
(45) Date of Patent: Jun. 22, 2010

(54) TURBOFAN CASE AND METHOD OF MAKING

(75) Inventors: Andreas Eleftheriou, Woodbridge (CA);
Kevin Walter Lobo, Mississauga (CA);
Maurice Weinberg, Toronto (CA);
Quantai Liu, Mississauga (CA)

(73) Assignee: Pratt & Whitney Canada Corp.,
Longueuil, Quebec (CA)

( * ) Notice: Subject to any disclaimer, the term of this patent is extended or adjusted under 35 U.S.C. 154(b) by 56 days.

(21) Appl. No.: 11/780,852

(22) Filed: Jul. 20, 2007

(65) Prior Publication Data

US 2008/0010996 A1 Jan. 17, 2008

Related U.S. Application Data

(60) Division of application No. 10/883,987, filed on Jul. 6, 2004, now Pat. No. 7,266,941, which is a continuation-in-part of application No. 10/628,556, filed on Jul. 29, 2003, now Pat. No. 7,370,467.

(51) Int. Cl.
*F02K 3/04* (2006.01)
*F02C 7/20* (2006.01)
(52) U.S. Cl. .................. 60/226.1; 60/797; 415/208.4
(58) Field of Classification Search ............ 60/797, 60/226.1; 415/208.4, 209.4
See application file for complete search history.

(56) References Cited

U.S. PATENT DOCUMENTS

| | | | |
|---|---|---|---|
| 2,404,334 A | 7/1946 | Whittle | |
| 2,879,959 A | 3/1959 | Morrison et al. | |
| 2,928,648 A | 3/1960 | Haines et al. | |
| 3,166,903 A * | 1/1965 | White | 60/797 |
| 3,620,009 A | 11/1971 | Wilde | |
| 3,720,060 A | 3/1973 | Davies et al. | |
| 3,814,549 A | 6/1974 | Cronstedt | |
| 3,830,058 A * | 8/1974 | Ainsworth | 60/797 |
| 3,841,091 A * | 10/1974 | Sargisson et al. | 60/226.3 |
| 3,902,314 A | 9/1975 | Straniti | |
| 4,043,522 A | 8/1977 | Vetter | |
| 4,055,041 A | 10/1977 | Adamson et al. | |
| 4,063,847 A | 12/1977 | Simmons | |
| 4,122,672 A | 10/1978 | Lowrie | |
| 4,132,069 A | 1/1979 | Adamson et al. | |
| 4,249,859 A | 2/1981 | Benyi, Jr. et al. | |
| 4,471,609 A | 9/1984 | Porter et al. | |
| 4,492,078 A * | 1/1985 | Williamson | 60/797 |
| 4,502,276 A | 3/1985 | Pask | |
| 4,598,600 A | 7/1986 | Knowles | |
| 4,716,721 A | 1/1988 | Pask et al. | |
| 4,722,184 A | 2/1988 | Chaplin et al. | |

(Continued)

FOREIGN PATENT DOCUMENTS

EP 0843090 5/1998

(Continued)

OTHER PUBLICATIONS

The Modern Gas Turbine (Rolls-Royce 2000).

*Primary Examiner*—Ted Kim
(74) *Attorney, Agent, or Firm*—Ogilvy Renault LLP

(57) ABSTRACT

A casing for a gas turbine includes a construction providing improved structural efficiency. Improved load paths and means for transmitting loads in the engine case are disclosed.

2 Claims, 15 Drawing Sheets

U.S. PATENT DOCUMENTS

| | | | |
|---|---|---|---|
| 4,766,723 A | 8/1988 | Newton |
| 4,790,133 A | 12/1988 | Stuart |
| 4,825,648 A | 5/1989 | Adamson |
| 4,872,767 A | 10/1989 | Knapp |
| 4,900,221 A | 2/1990 | Ciokajlo et al. |
| 4,987,736 A | 1/1991 | Ciokajlo et al. |
| 5,076,049 A | 12/1991 | Von Benken et al. |
| 5,080,555 A | 1/1992 | Kempinger |
| 5,083,426 A | 1/1992 | Layland |
| 5,157,915 A | 10/1992 | Bart |
| 5,174,525 A | 12/1992 | Schilling |
| 5,207,054 A | 5/1993 | Rodgers et al. |
| 5,299,910 A | 4/1994 | Gilchrist |
| 5,357,744 A | 10/1994 | Czachor et al. |
| 5,367,874 A | 11/1994 | Auffret et al. |
| 5,372,338 A | 12/1994 | Carlin et al. |
| 5,409,184 A | 4/1995 | Udall et al. |
| 5,483,792 A | 1/1996 | Czachor et al. |
| 5,797,684 A | 8/1998 | Becker |
| 5,832,715 A | 11/1998 | Dev |
| 5,899,660 A | 5/1999 | Dodd |
| 5,924,288 A | 7/1999 | Fortuna et al. |
| 6,004,095 A | 12/1999 | Waitz et al. |
| 6,068,212 A | 5/2000 | Ash et al. |
| 6,109,022 A | 8/2000 | Allen et al. |
| 6,145,300 A | 11/2000 | Romani |
| 6,148,600 A | 11/2000 | Farmer et al. |
| 6,151,882 A | 11/2000 | Cavanagh |
| 6,195,983 B1 * | 3/2001 | Wadia et al. ............... 60/226.1 |
| 6,241,465 B1 | 6/2001 | Ulma et al. |
| 6,305,899 B1 | 10/2001 | Saunders |
| 6,308,915 B1 | 10/2001 | Liston et al. |
| 6,371,721 B1 | 4/2002 | Sathianathan et al. |
| 6,532,731 B2 | 3/2003 | Springer |
| 6,679,045 B2 | 1/2004 | Karafillis et al. |
| 6,758,439 B2 | 7/2004 | Harrison et al. |
| 6,881,029 B2 | 4/2005 | Le Biez et al. |
| 6,910,851 B2 | 6/2005 | Franconi et al. |

FOREIGN PATENT DOCUMENTS

| | | |
|---|---|---|
| GB | 2070691 | 9/1981 |
| GB | 1605252 | 6/1986 |
| WO | 85/01987 | 5/1985 |
| WO | 2005/012696 | 2/2005 |

\* cited by examiner

FIG_7

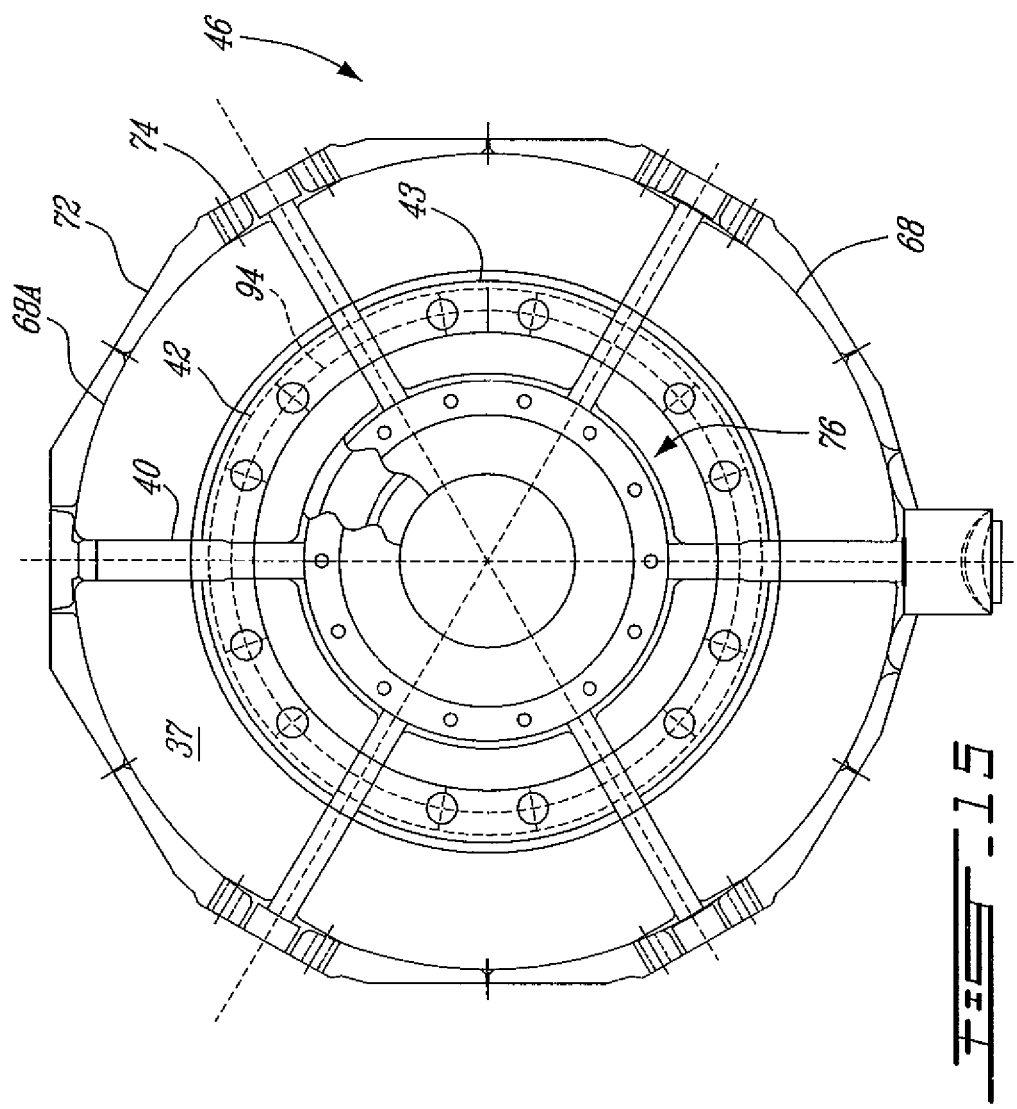
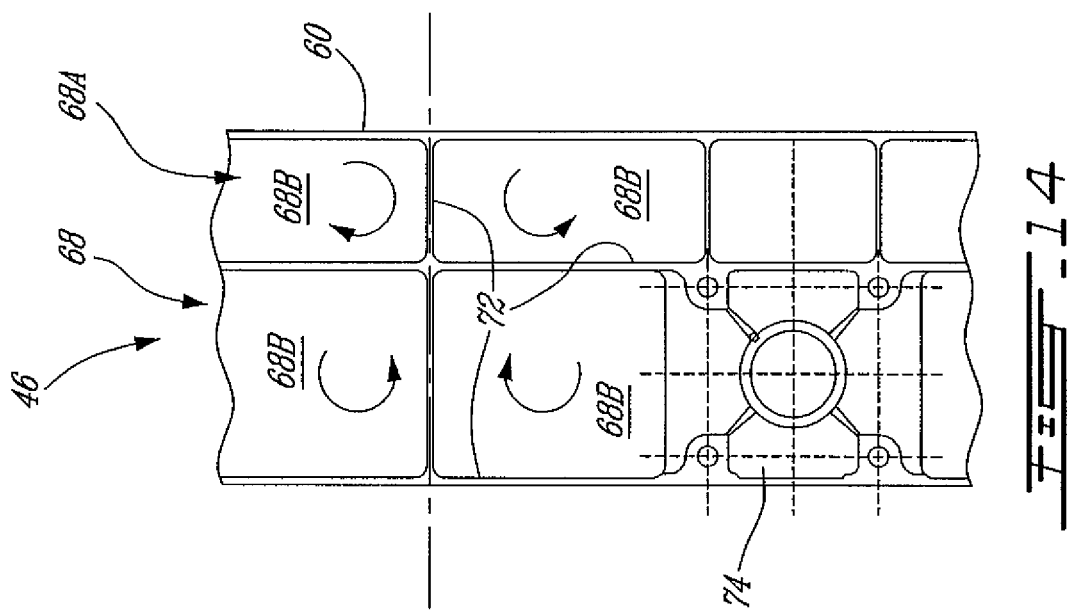

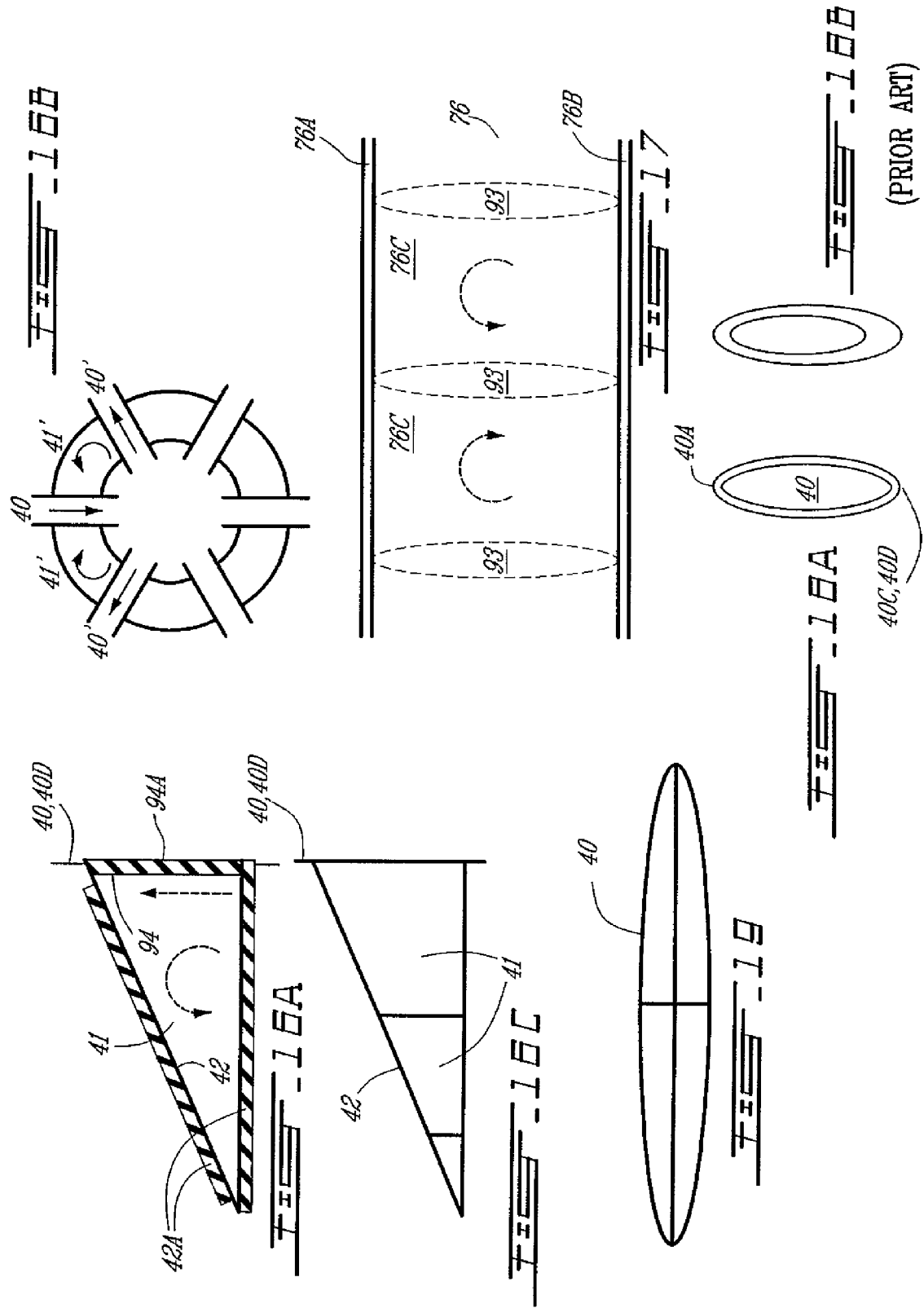

TURBOFAN CASE AND METHOD OF MAKING

CROSS-REFERENCE

This application is a division of application Ser. No. 10/883,987, filed Jul. 6, 2004, now U.S. Pat. No. 7,266,941, which is a continuation in part of application Ser. No. 10/628,556, filed Jul. 29, 2003, now U.S. Pat. No. 7,370,467.

FIELD OF THE INVENTION

This invention relates to gas turbine engines, and more particularly to a case for a turbofan engine.

BACKGROUND OF THE INVENTION

The general aviation market has recently been introduced to the "very small" turbofan engine (i.e. 2000 pounds thrust and less). Simply scaling down larger conventional turbofan engines, however, presents difficulties due mainly to the disproportionate scaling of certain factors, such as strength-to-weight and tolerances.

The engine case, such as that depicted in FIGS. 1 and 2, is subjected to asymmetric loading relative to the engine mounts, caused by loads exerted through the bearings, such as engine thrust, foreign object impacts and blade-off events, and caused by inertia loads caused by the engine weight which of course must be supported. These asymmetric loads result in bending moments and shears which must be transmitted through the engine case to the engine mounts. The prior art generally relies on thick walled structures, such as cast engine case components (such as 202 204, 206, 208, 210, 211 in FIG. 1), to react these bending moments in plate bending. Plate bending, however, requires thicker-walled casings to resist and carry bending forces without failure. In very small engines, however, thick casing become a significant component in overall engine weight.

An alternate approach is shown in U.S. Pat. No. 4,132,069, which provides an integrally-webbed structure for transferring loads, and in particular bending, through an engine and nacelle structure, so that nacelle loads can be passed to the engine. The scheme, however, adds components to the engine, which reduces reliability, and increases weight and cost. Improvement in engine case technology is therefore desired.

SUMMARY OF THE INVENTION

It is therefore one object of the present invention to provide improvements gas turbine engine case technology.

In accordance with one aspect of the present invention, there is provided a casing for an aircraft turbofan bypass engine, the casing comprising a case adapted to encircle the engine and having a plurality of engine mounts thereon adapted to mount the engine to an aircraft; an inner hub adapted to support at least one bearing supporting a main shaft of the engine, the inner hub supported inside the case by a plurality of struts extending between the inner hub to the case, the struts defining a primary load path from the inner hub to the case; and a splitter supported intermediate the inner hub and case by the struts, the struts further defining a primary splitter load path from the splitter to the case, the splitter adapted to divide an engine ingested airflow between a core airflow passage and a bypass airflow passage of the engine, wherein the case has a semi-monocoque configuration including a plurality of ribs and a plurality of thin-walled shear panels therebetween, the case thereby being adapted to balance external loading applied to the casing by compressive and tensile forces in the ribs to react balanced shear in the panels.

In accordance with another aspect of the present invention, there is provided an aircraft bypass turbofan engine comprising an engine core and a casing surrounding at least a portion of the engine core, the casing including a plurality of hollow struts and a plurality of adjoining members, the struts extending in a circumferential array between an inner hub and the casing, each of the struts adjoined to at least two circumferentially adjacent struts by at least one of the members, the members each having two end portions each mounted to a strut side, each member comprising a hollow closed section, the closed section at least partially closed by the strut sides and at least one element extending between adjacent struts, the element adapted by reason of its alignment relative to the member and adjacent struts to transmit a shear force into the struts when a torque is applied to the member.

In accordance with a further aspect of the present invention, there is provided an aircraft bypass turbofan engine casing comprising a outer ring portion, an inner hub portion and a plurality of hollow struts and a plurality of hollow torque box members, the outer ring portion having at least one engine mount thereon for engine-supporting connection to an aircraft, the struts arranged in a circumferential array and extending from the inner hub portion to the outer ring portion to mount the inner hub portion to the outer ring portion, the plurality of torque box members arranged such that at least one extends between adjacent struts in the array to thereby connect each strut to immediately adjacent struts, the torque box members adapted to convert a torque applied thereto into a shear force and transmit said shear force into the struts.

In accordance with a further aspect of the present invention, there is provided a load carrying apparatus for a aircraft bypass turbofan engine, the apparatus comprising an inner hub supporting at least one main shaft bearing; an outer casing having at least one engine mount; and a hollow strut assembly including a plurality of struts extending in an circumferential array, the plurality of struts each extending from a first end connected to the inner hub to a second end connected to the outer casing, the struts having sides facing immediately adjacent struts in the array, the strut assembly including means for load sharing between adjacent struts, said means extending between adjacent struts and connecting to an intermediate portion of each strut side.

In accordance with a further aspect of the present invention, there is provided a load carrying apparatus for a aircraft bypass turbofan engine, the apparatus comprising an outer ring and an inner ring together defining at least one air flow passage therebetween, a plurality of hollow struts extending radially between the outer and inner rings across the passage in a circumferential array, and a plurality of hollow torque boxes, each torque box bonded with shear-transferring joints to an intermediate portion of adjacent struts, the outer ring having a plurality of engine mounts for mounting the engine to an aircraft, the torque boxes including a web member adapted to transfer a torque applied to the torque box by an engine core mounted thereto into the strut as shear for engine core load transfer to the engine mounts.

In accordance with a further aspect of the present invention, there is provided a casing for an aircraft bypass turbofan engine, the casing comprising a case adapted to encircle the engine and having a plurality of engine mounts thereon adapted to mount the engine to an aircraft; an inner hub adapted to support at least one bearing supporting a main shaft of the engine, the inner hub supported relative to the case by a plurality of struts extending between the inner hub to the case, the inner hub having a semi-monocoque configuration including a plurality of stiffeners and a plurality of thin-walled shear panels therebetween, the inner hub thereby being adapted to resolve external bending forces applied to the inner hub substantially as compressive and tensile forces in the stiffeners and shear in the panels.

In accordance with a further aspect of the present invention, there is provided a casing for an aircraft bypass turbofan engine, the casing comprising a case adapted to encircle the engine and having a plurality of engine mounts thereon adapted to mount the engine to an aircraft; an inner hub adapted to support at least one bearing supporting a main shaft of the engine, the inner hub supported relative to the case by a plurality of struts extending between the inner hub to the case, the inner hub having a semi-monocoque configuration including a plurality of stiffeners and a plurality of thin-walled shear panels therebetween, the stiffeners and panels configured to react external bending moments applied to the inner hub as compressive and tensile forces in the stiffeners and shear in the panels.

In accordance with a further aspect of the present invention, there is provided a casing for an aircraft turbofan bypass engine, the casing comprising a case adapted to encircle the engine and having a plurality of engine mounts thereon adapted to mount the engine to an aircraft; an inner hub adapted to support at least one bearing supporting a main shaft of the engine, the inner hub supported inside the case by a plurality of struts extending between the inner hub to the case, the struts defining a primary load path from the inner hub to the case; and a splitter supported intermediate the inner hub and case by the struts, the struts further defining a primary splitter load path from the splitter to the case, the splitter adapted to divide an engine ingested airflow between a core airflow passage and a bypass airflow passage of the engine, wherein the struts include means in a trailing edge portion thereof for interrupting a load path between the splitter and inner hub to thereby inhibit the transfer of splitter loads to the inner hub.

In accordance with a further aspect of the present invention, there is provided a shaft bearing support apparatus for a gas turbine engine, the apparatus comprising a bearing support member, a stop apparatus and a stop surface, wherein the stop apparatus and stop surface are subject to relative deflection therebetween when a shaft supported by a bearing mounted to the bearing support member deflects in use, and wherein a clearance is provided between the stop apparatus and stop surface equal to a maximum desired magnitude of said relative deflection such that contact between the stop apparatus and the stop surface occurs when said maximum desired relative deflection occurs, the stop apparatus and the stop surface thereby being adapted to arrest deflection beyond said maximum desired relative deflection by reason of said contact.

In accordance with a further aspect of the present invention, there is provided a casing for an aircraft turbofan bypass engine, the casing comprising a case adapted to encircle the engine and having a plurality of engine mounts thereon adapted to mount the engine to an aircraft; a plurality of struts extending between an engine structure and the case, the struts defining a primary load path from the engine structure to the case for transfer of loading from engine structure to the engine mounts on the case, the struts each having a centroidal axis defined along a locus of centroid positions for a plurality of strut sections along a length of the strut, wherein the engine mounts are positioned on the case to substantially correspond with at one of said strut centroidal axes to thereby minimize bending loads in the case as a result of loads transferred by the struts to the engine mounts.

In accordance with a further aspect of the present invention, there is provided a casing for an aircraft turbofan bypass engine, the casing comprising a case adapted to encircle the engine and having a plurality of engine mounts thereon adapted to mount the engine to an aircraft; a plurality of struts extending between an engine structure and the case, the struts defining at least one load path from the engine structure to the case for transfer of loading from engine structure to the engine mounts on the case, wherein at least some struts are adapted to plastically deform in response to the application of a pre-selected load along said load path thereto thereby limiting load transfer from the struts to the engine mounts by said struts to an amount below said pre-selected load. Also disclosed is a method of providing such a casing.

Still other features and advantages of the present invention will be better understood with reference to the preferred embodiments described hereinafter.

It should be noted that the terms of "integral", "integrating" and "integrated" used throughout the text of this application and appended claims, are intended to mean items which are integrally joined such that disassembly (in a typical non-destructive sense) is not possible.

BRIEF DESCRIPTION OF THE DRAWINGS

Having thus generally described the nature of the present invention, reference will now be made to the accompanying drawings, showing by way of illustration the preferred embodiments thereof, in which:

Amended

Amended

FIG. 14 is a partial top view of the case of FIG. 13;

FIG. 15 is a rear view of the case of FIG. 12;

FIG. 16A is a schematic representation of the force transfer in the splitter and strut of the case of FIG. 12 from a perspective similar to that of FIG. 15;

FIG. 16B is a schematic representation of the force transfer in the splitter and strut of the case of FIG. 12 from a perspective similar to that of FIG. 15;

FIG. 16C is a schematic representation similar to that of FIG. 16A, showing an alternate configuration for the splitter;

FIG. 17 is a somewhat schematic top plan view of the inner hub of the case of FIG. 12;

FIG. 18A is a cross-sectional view through the strut of FIG. 12;

New FIG. 18B shows a view of a prior art strut from a perspective similar to that of FIG. 18A; and New FIG. 19 is a somewhat schematic view of an alternate configuration for the strut of FIG. 12.

DETAILED DESCRIPTION OF THE PREFERRED EMBODIMENTS

Figure 1:
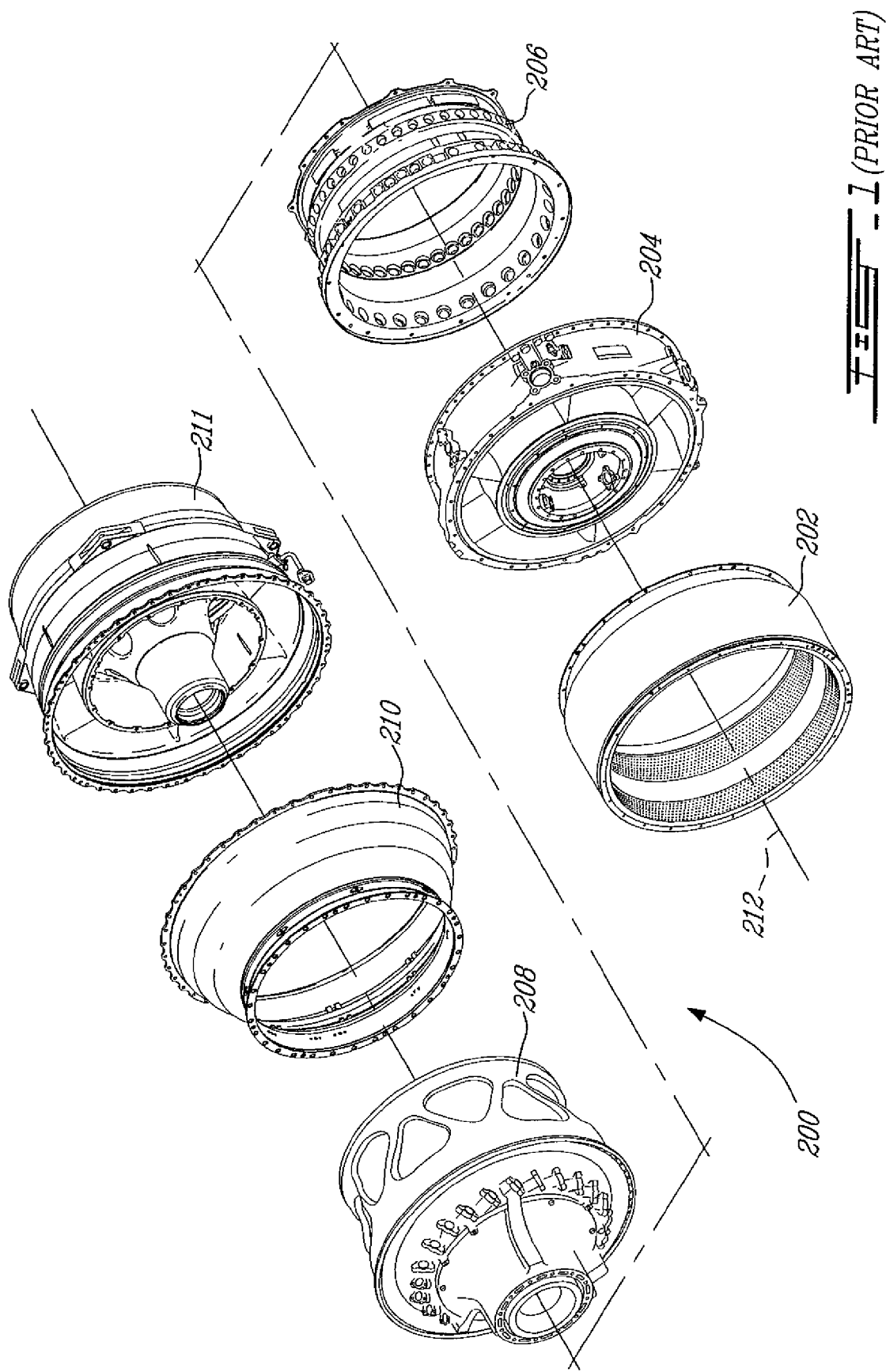
FIG. 1 is a simplified exploded perspective view of a conventional case assembly of a turbofan engine.
Figure 2:
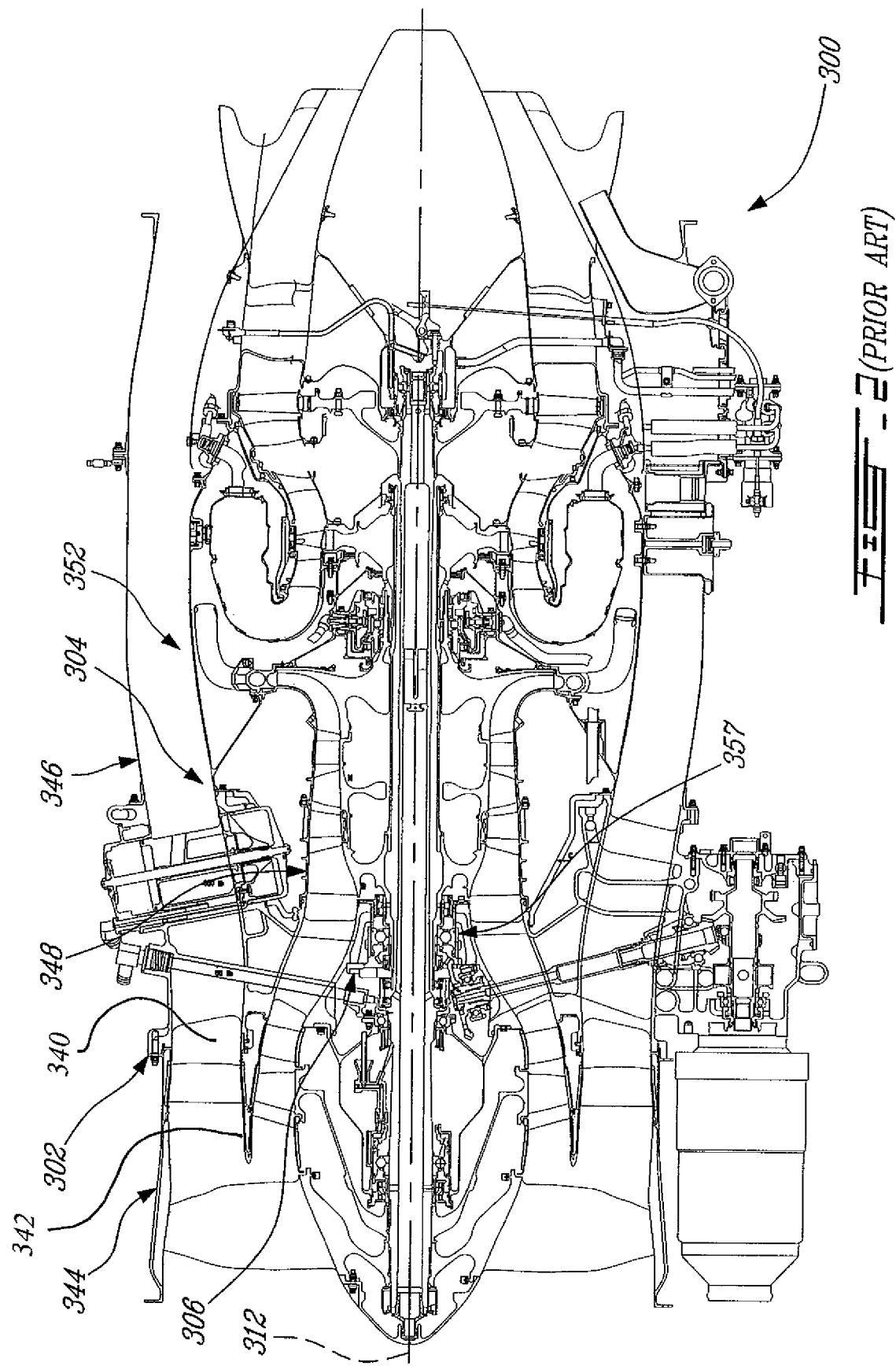
FIG. 2 is a schematic cross-sectional view of a similar conventional case assembly.
Figure 3:
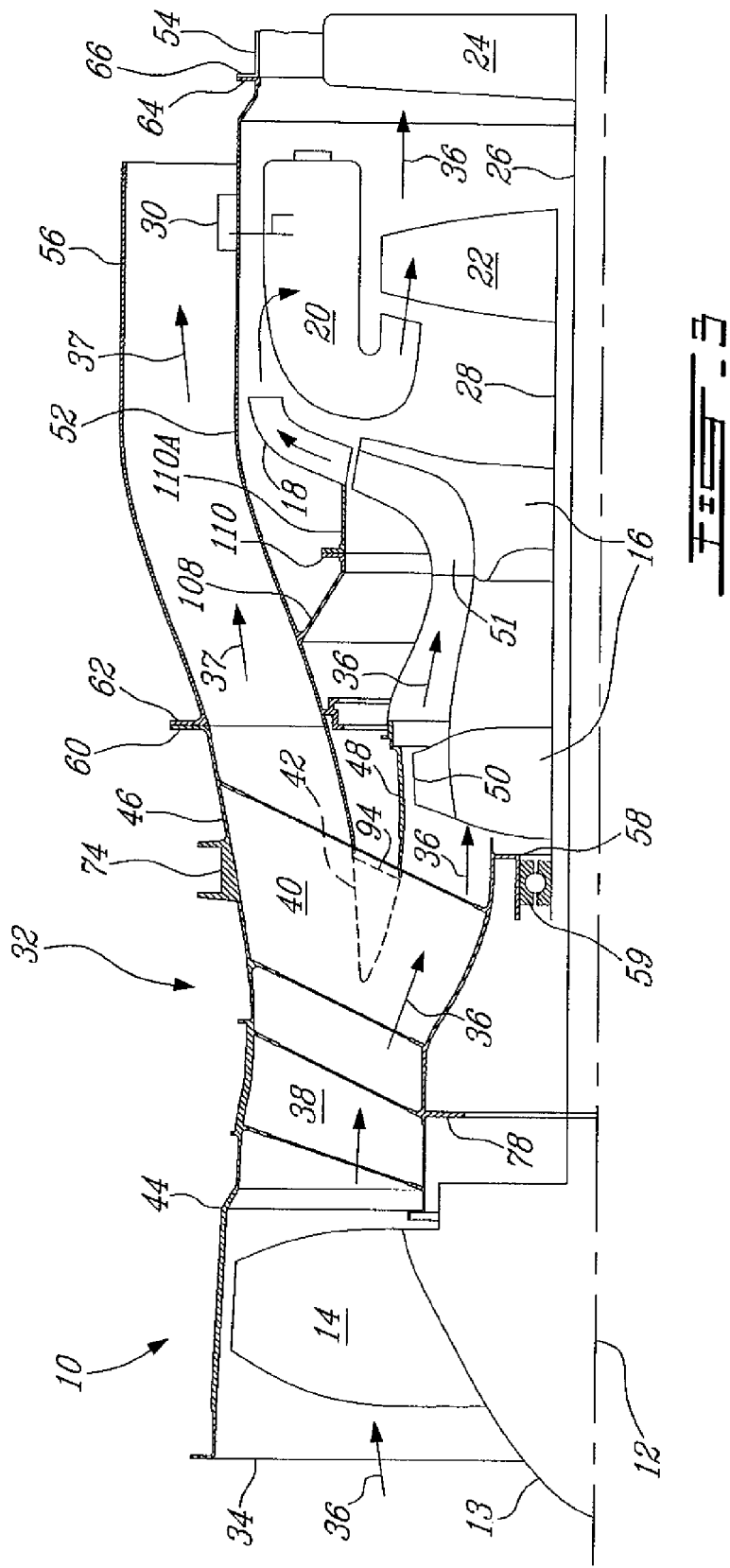
FIG. 3 is a schematic cross-sectional view of a turbofan case according to the present invention.

Referring to the drawings, beginning with FIG. 3, an exemplary turbofan gas turbine engine 10 according to the present invention includes in serial flow communication about a longitudinal central axis 12, a fan assembly 13 having a plurality of circumferentially spaced fan blades 14, a compressor section 16 having a plurality of circumferentially spaced low pressure compressor (LPC) blades 50 and high pressure compressor (HPC) blades 51, a diffuser 18, a combustor 20, a high pressure turbine (HPT) 22, and a low pressure turbine (LPT) 24. LPT 24 is connected to the fan assembly 13 by a first or low pressure (LP) shaft 26, and HPT 22 is connected to compressor assembly 16 by a second or high pressure (HP) shaft 28. Fuel injecting means 30 are provided for injecting fuel into the combustor 20

A generally tubular casing assembly 32 having a envelops the engine 10 and thereby defines a main flow path 36 through the core of engine 10, extending from an inlet 34 to an exhaust outlet (not shown), and a by-pass flow path 37.

Figure 4:
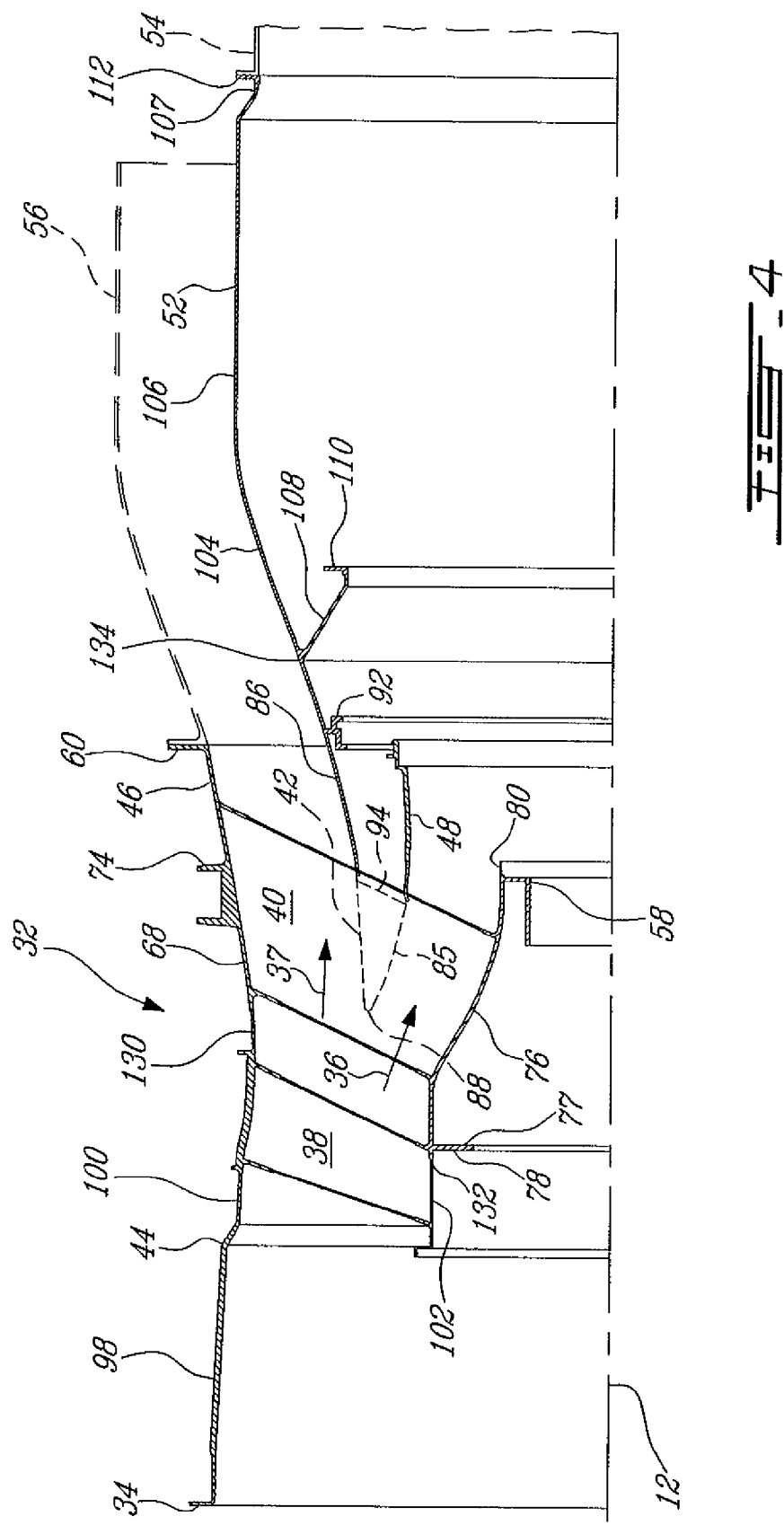
FIG. 4 is a schematic partial cross-sectional view of the embodiment of FIG. 3.
Figure 6:
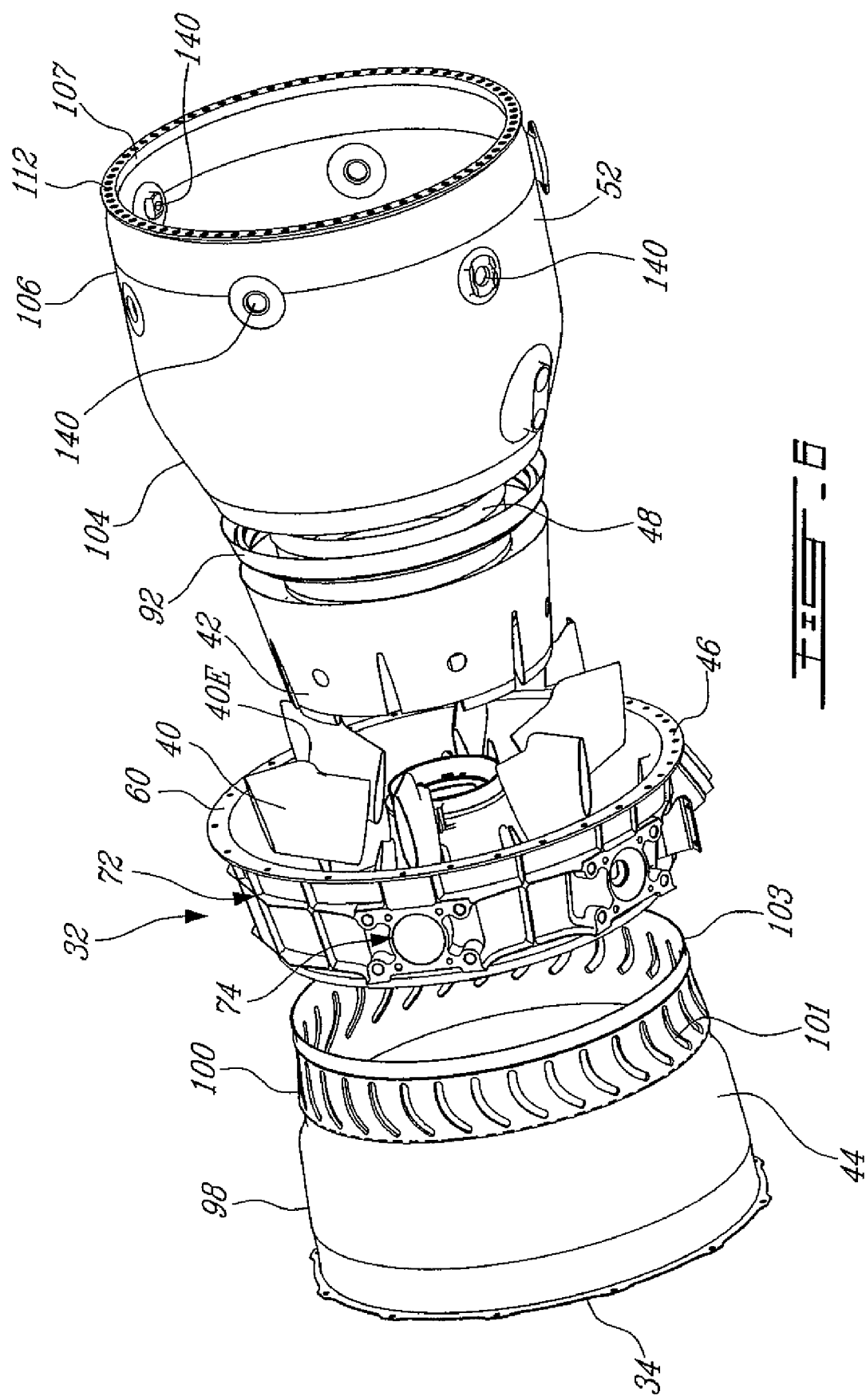
FIG. 6 is an exploded isometric view of the assembly of FIG. 4, illustrating the assembly sequence of the intercase portion of FIG. 5.

Referring to FIGS. 3, 4 and 6, the casing assembly 32 according to one embodiment of the present invention includes a generally tubular fan portion or "case" 44, which houses the fan rotor assembly 13, a generally tubular intercase or intermediate portion or "case" 46 downstream of fan case 44 and a gas generator portion or "case" 52 downstream of intermediate portion 46. The intermediate portion 46 includes a compressor shroud 48 which encircles the blade tips of the compressor assembly 16, and a bearing seat 58 for mounting the HP shaft bearing 59 thereto, as will be described further below.

Figure 5:
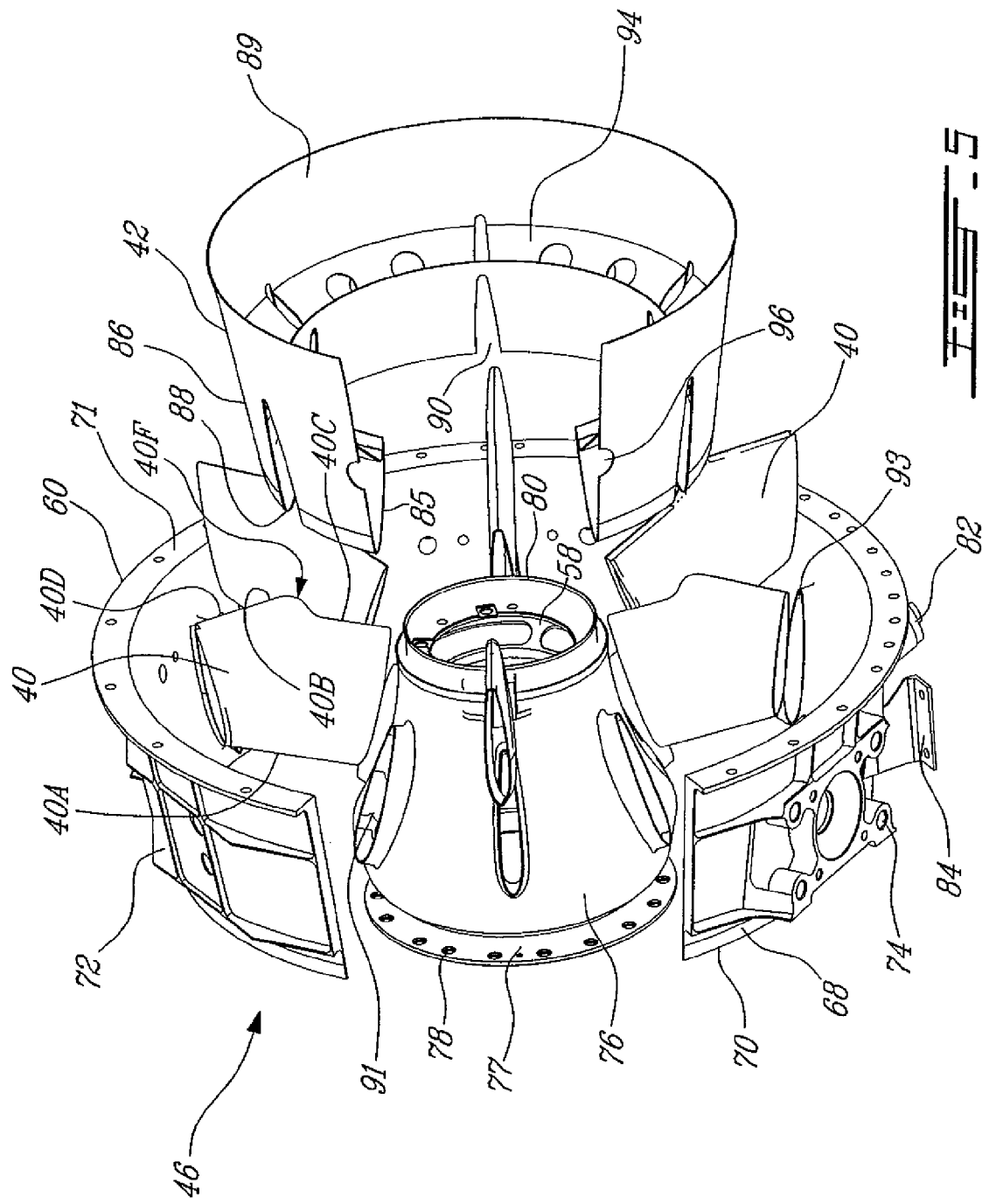
FIG. 5 is a exploded isometric view, with a portion cut away, of an intermediate portion of the assembly of FIG. 4.

With reference to FIGS. 5 and 6, gas generator portion 52, which is also generally tubular in shape, is for housing the combustor 20 and perhaps HPT 22 or a section thereof. A generally tubular case turbine and exhaust case 54 is preferably modularly provided and mounted to (i.e. not integrated with) the aft end 107 of gas generator case 52 for housing the LPT 24, and supporting an exhaust mixer assembly (not shown).

The engine 10 further includes a tubular bypass duct case 56, preferably modularly provided and mounted to (i.e. not integrated with) the intermediate portion 46 of casing assembly 32. The tubular bypass duct case 56 generally surrounds the gas generator portion 52 and is radially spaced apart therefrom, thereby defining a downstream section of the bypass 44 therebetween.

Rather than providing a prior art segmented case, in which the case components are removably mounted to one another, the present invention provides a single-piece casing assembly 32 in which all casing components are integrally attached to one another. Referring again to FIG. 3, fan case portion 44, intermediate case portion 46, compressor shroud portion 48, bearing mount 58 and gas generator portion 52 of casing assembly 32 are all integrally joined to one another, such as by welding, or by other process such as integral fabrication, brazing or other methods of joining and bonding the components into one piece. Preferably, the bypass duct case 56 is not integrated with casing 32, in order to provide convenience in assembly and maintenance of the engine assembly 10, and so rather is connected by bolting together mating flanges 60 and 62 which extend radially from the respective intermediate portion 46 and the bypass duct case 56. The turbine and exhaust case 54, as mentioned, is also preferably mounted to the aft end of the casing 32 by, for example, bolting together mated flanges 64 and 66. The bypass duct 56 and the case 54 are shown by broken lines in FIG. 4 to distinguish them from other cases which are most preferably integrated to form the integral case of the present invention. Casing assembly 32 can also integrally include the bypass and exhaust ducts, if desired.

The individual components of casing 32 are preferably made from one material, for example steel, although a combination of materials may be used (e.g. steel and Inconel, etc.) as long as the desired integral bonding technique (e.g. welding) permits such materials to be reliably bonded together. The individual portions of the casing are preferably made separately, as will be described further below, which would permit, for example, a variety of processes and materials to be used. Optionally, the casing 32 may be formed integrally substantially in a single operation, such as metal injection moulding.

Surprisingly, although the entire casing 32 of the present invention may be made from a relatively heavy material such as steel, in very small turbofan engines (i.e. preferably 2000 pounds thrust and less, more preferably 1500 pounds thrust and less, and most preferably about 1000 pounds thrust or less) the present invention provides unexpected and significant benefits which directly impact on engine SFC, as will now be described.

Firstly, even though a heavier material is used throughout (e.g. steel versus, say, magnesium), the weight savings from reduced flange count is surprisingly significant. Even scaled-down flanges represent a significant weight relative to the very small turbofan engine, and thus it has been found that their removal results in a disproportionate weight savings despite the addition of weight elsewhere in the casing, contrary to the teachings of the prior art. Therefore, contrary to the teachings of the prior art, it has been found that a segmented case permitting the use of lighter materials is actually heavier in the very small turbofan range. A beneficial redistribution of weight is therefore provided by the present invention.

Secondly, the reduction of flange connections also beneficially reduces tolerance stack-up by reducing the number of toleranced parts and connections. Accordingly, for example by integrating the compressor bearing mount and compressor shroud into a single part, a significantly smaller compressor blade tip clearance may be provided.

Thirdly, the reduction of thermally mismatched parts also permits a significant simplification to the very small turbofan engine. In a first aspect, the reduction of thermal mismatch improves the tolerances which must be left in connections. In a second aspect, by improving thermal mismatch within the casing 32, the interface with other systems, such as the accessory gearbox (AGB) is greatly simplified.

In a second aspect of the present invention, a configuration for casing 32 is disclosed which provides further benefits to the very small turbofan. Referring to FIGS. 4 and 5, the structure of the intermediate portion 46 of casing 32 will now be described in more detail. The intermediate portion 46 includes an outer ring 68 having a forward end 70 and a rearward end 71 integrated with the radially outwardly extending bypass duct flange 60. On the external surface of the outer ring 68 are provided stiffening ribs 72, which reinforce the rigidity of the outer ring 68, and engine mounts 74 which also assist in this regard. As can be seen in FIGS. 5 and 6, ribs 72 are arranged in a grid-like manner relative to one another and thereby divide outer ring 68 into a plurality of panels 68B. A mounting support 82 on the outer ring 68 is provided for operatively supporting the AGB tower shaft (not shown), and to provide further stiffness to ring 68. Also provided on the outer ring 68 are attachment brackets 84 for attaching the AGB. Other services, such as oil tube inlet 83 and N1 probe boss 85, are also provided.

The intermediate portion 46 of casing 32 also includes an inner hub 76 which has a forward end 78 and a rearward end 80. The inner hub 76 is positioned coaxially with the outer ring 68 and is supported within the outer ring 68 by a plurality of casing struts 40 which are circumferentially spaced apart and extend radially outwardly and generally rearwardly from the inner hub 76 to the outer ring 68, as will be described further below. The annular bearing seat 58 which receives and supports preferably the HPC bearing 59 (see FIG. 3) is integrally attached (for example, by welding, as described below) to the rearward end 80 of the inner hub 76. A mounting flange 77 is also provided on the forward end 78 of the inner hub 76 (see FIGS. 4 and 5) for attaching a forward bearing housing (not shown) for the LP shaft bearings.

The intermediate portion 46 of casing 32 also includes a splitter 42, which includes an annular inner wall 85 and an annular outer wall 86 extending axially and downstream relative to the air flow through engine 10, divergent from an annular leading edge tip 88. A section of the annular bypass path 37 is thereby defined between the outer ring 68 and the annular outer wall 86 of the splitter 42, while core flow path 36 is defined between the annular inner wall 85 of the splitter 42 and the inner hub 76. An internal web 94 is provided within splitter 42, between the inner and outer walls 85, 86, and affixed thereto, and preferably also affixed to struts 40, as will be described further below. As described previously, the compressor shroud 48, which is preferably thicker than the inner wall 85 of the splitter 42 to withstand the demands of the compressed air flow, is integrated (for example by welding, as described further below) to the inner wall 85.

A plurality of circumferentially spaced apart slots 90 extend generally from near the annular tip 88 axially into the splitter 42, for receiving the respective casing struts 40. A plurality of corresponding bosses 91 and 93 are respectively provided in the inner hub 76 and the outer ring 68 for attaching the casing struts 40.

A bleed valve housing 92 (see FIGS. 4 and 6) is preferably attached by welding, to the annular outer wall 86 of the splitter 42 at its rearward end, for securing bleed valve(s) (not shown) thereto. The intermediate portion 46 also bleed holes 96 defined in the outer wall 86 of the splitter 42, for co-operation with an air bleed system (not shown). Bleed holes 96 are preferably made when fabricating the splitter 42.

Though when assembled it has the appearance of a prior art intercase, which is most typically cast, the present invention advantageously permits the individual components of intermediate portion 46 may be made in accordance with a variety of manufacturing processes. The preferred processes will now be described. Outer ring 68 and inner hub 76 are machined from solid. Outer ring 68 is generally quite thin (i.e. sheet-metal-like) and, in conjunction with stiffener ribs 72, provide intercase portion 46 with a semi-monocoque construction which is lightweight yet strong. Service attachments, such oil tube inlet 83 and N1 probe boss 85, are cast (or metal injection moulded, forged, machined, etc., as desired) and welded or brazed to outer ring, while other "attachments" such as tower shaft support 82 are integrally machined with the ring. Struts 40 are formed preferably in sheet metal halves (though processes such as metal injection moulding, hydro-forming, flow forming, casting, etc. may be used) and then integrally joined by welding to provide a hollow configuration. One strut preferably receives an AGB tower shaft (not shown), another the oil tube and N1 probe (not shown), and so on. The struts 40 are preferably welded to bosses 91 and 93 and within slots 90, to thereby assemble outer ring 68, splitter 42 and inner hub 70 to provide intercase portion 46 of casing 32.

Figure 9:
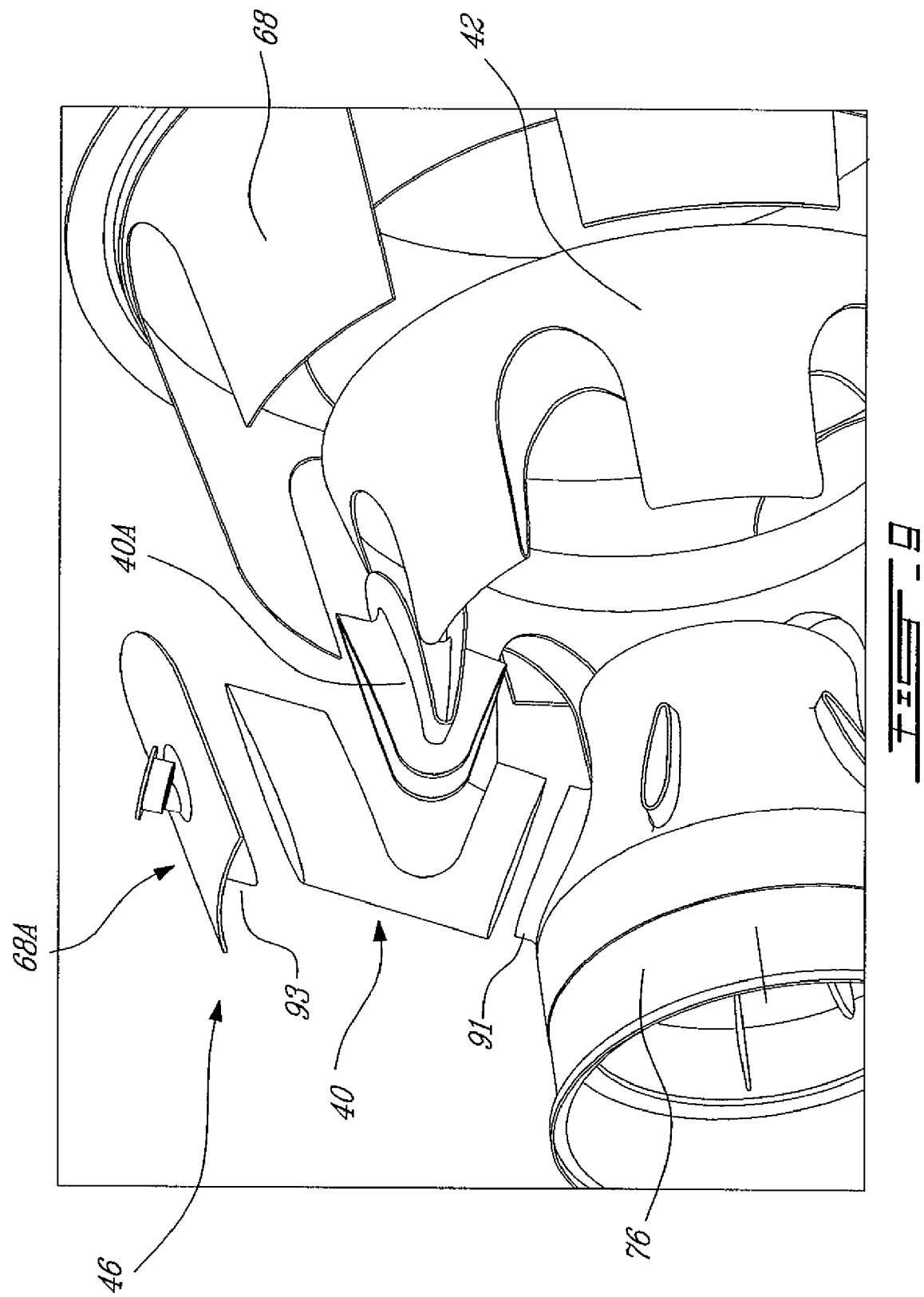
FIG. 9 is an exploded and enlarged isometric front view of a portion of an alternate embodiment of the intercase portion of the present invention.

Referring to FIG. 9, in an alternate embodiment, intercase portion 46 may have struts 40 which have a configuration which provides a modified joint with splitter 42 and outer ring 68, through the inclusion of flanged components 40A and 68A which may be welded to struts 40 and outer ring 68 respectively. Such flanged components may be provided to facilitate stronger connection welds, etc. and thus this embodiment further illustrates the flexibility the present invention gives the designer.

The individual components are integrated together preferably by welding (or other integral joining technique of the general types already mentioned) to provide the integrated intermediate portion 46, and this is preferably before integrating the intermediate portion 46 with the other portions of the casing 32 (i.e. fan portion 44, etc.). The details of the intermediate portion 46 may vary depending on various embodiments used for various engine models.

Referring to FIGS. 4 and 6, the fan portion 44 includes an annular upstream section 98 encircling the fan blades 14 (see FIG. 3). The upstream section 98 is preferably strong enough to ensure containment of a blade-off incident, or incorporate an insert therefor (not shown). The fan case 44 includes a downstream section 100 which extends from the upstream section 98 to a downstream edge 103. The downstream section 100 incorporates slots 101 which locates and supports the outer end of fan exit vanes 38, as will be described below.

Figure 10:
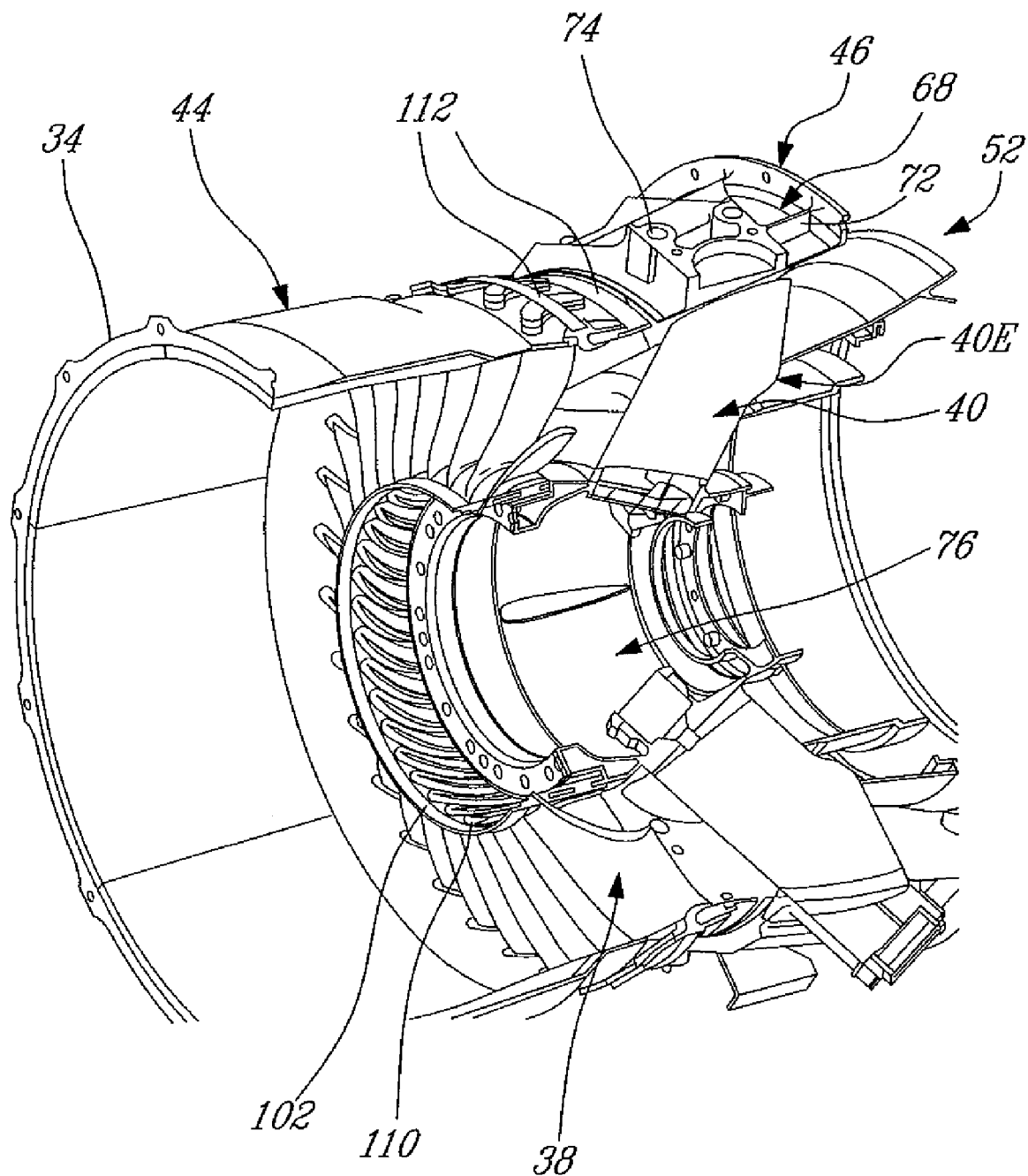
FIG. 10 is an enlarged isometric front view of a cross-section of the assembled case of the present invention.
Figure 11:
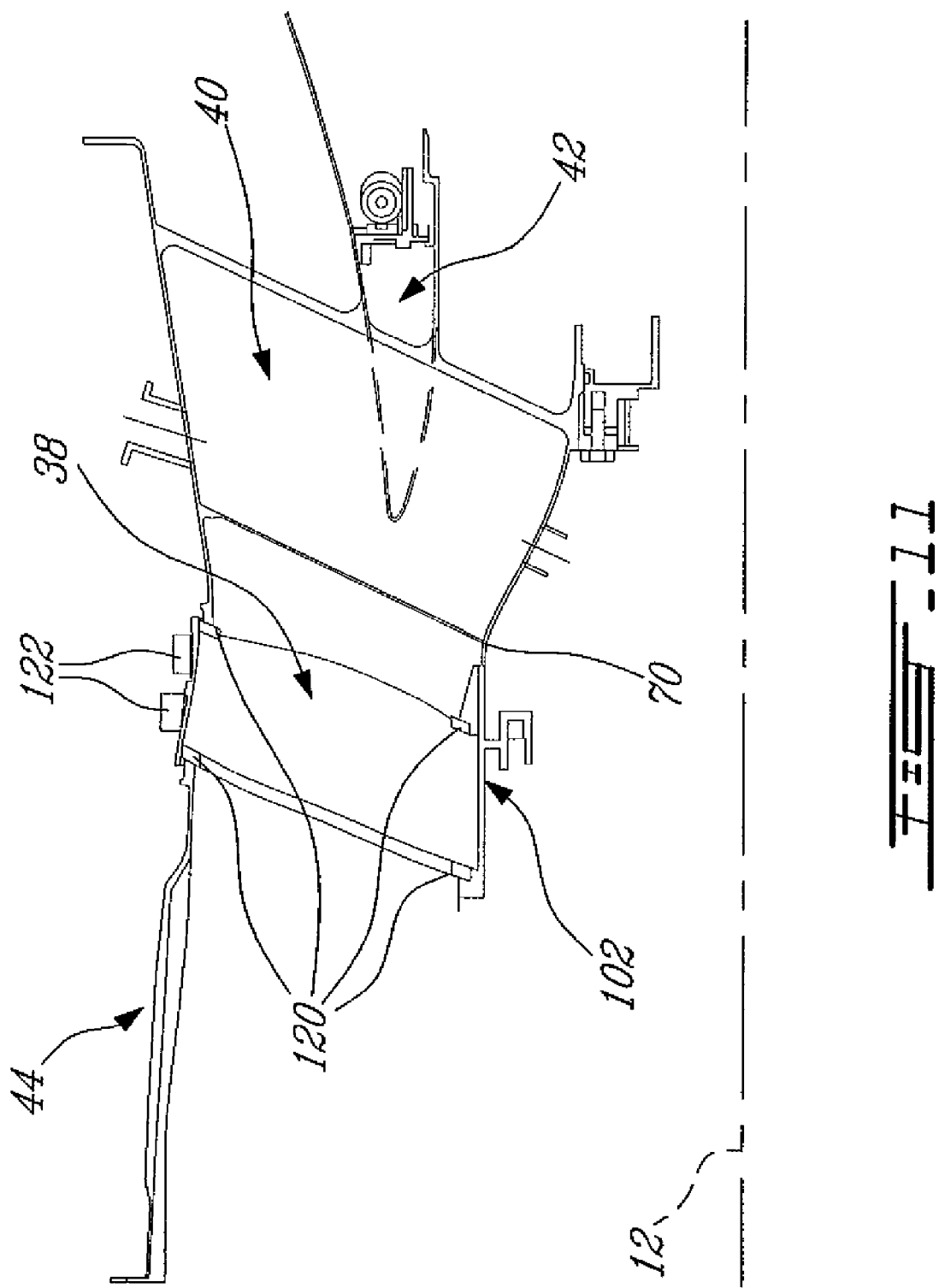
FIG. 11 is an enlarged cross-sectional view of a portion of the present invention showing the fan exit vane installation.

Referring to FIG. 10, the stator-less fan exit vanes 38 are slidingly inserted preferably from outside the fan portion 44 and therefore slots 101 are defined accordingly in the section 100 of the fan portion 44 (see FIG. 6) and in the inner shroud 102. The fan exit vanes 38 are releasably mounted between the section 100 of the fan portion 44 and the inner shroud 102 at the corresponding slots, and releasably retained therein by pliable compression-fit insert grommets 120 (see FIG. 11) and straps 122.

Fan portion 44 may be flow-formed from one material, such as steel, nickel or inconel. Alternate fabrication or forming techniques may also be used, and one or more materials may be used.

The fan portion 44 is integrated into the intermediate portion 46 by integrally joining, preferably by welding, the aft end 103 of fan case portion 44 with the forward end 70 of the outer ring 68 of the intermediate portion 4 to thereby create an integral joint 130 (see FIG. 4). The inner shroud 102 of the fan portion 44 is also attached to the inner hub 76 of the intermediate portion 46, preferably by welding at 132. The inner shroud 102 and the fan exit vanes 38 are preferably not integrated with the casing assembly 32, but rather are releasably mounted to the fan portion 44 as described above after the fan portion 44 is integrated with the intermediate portion 46.

Figure 12:
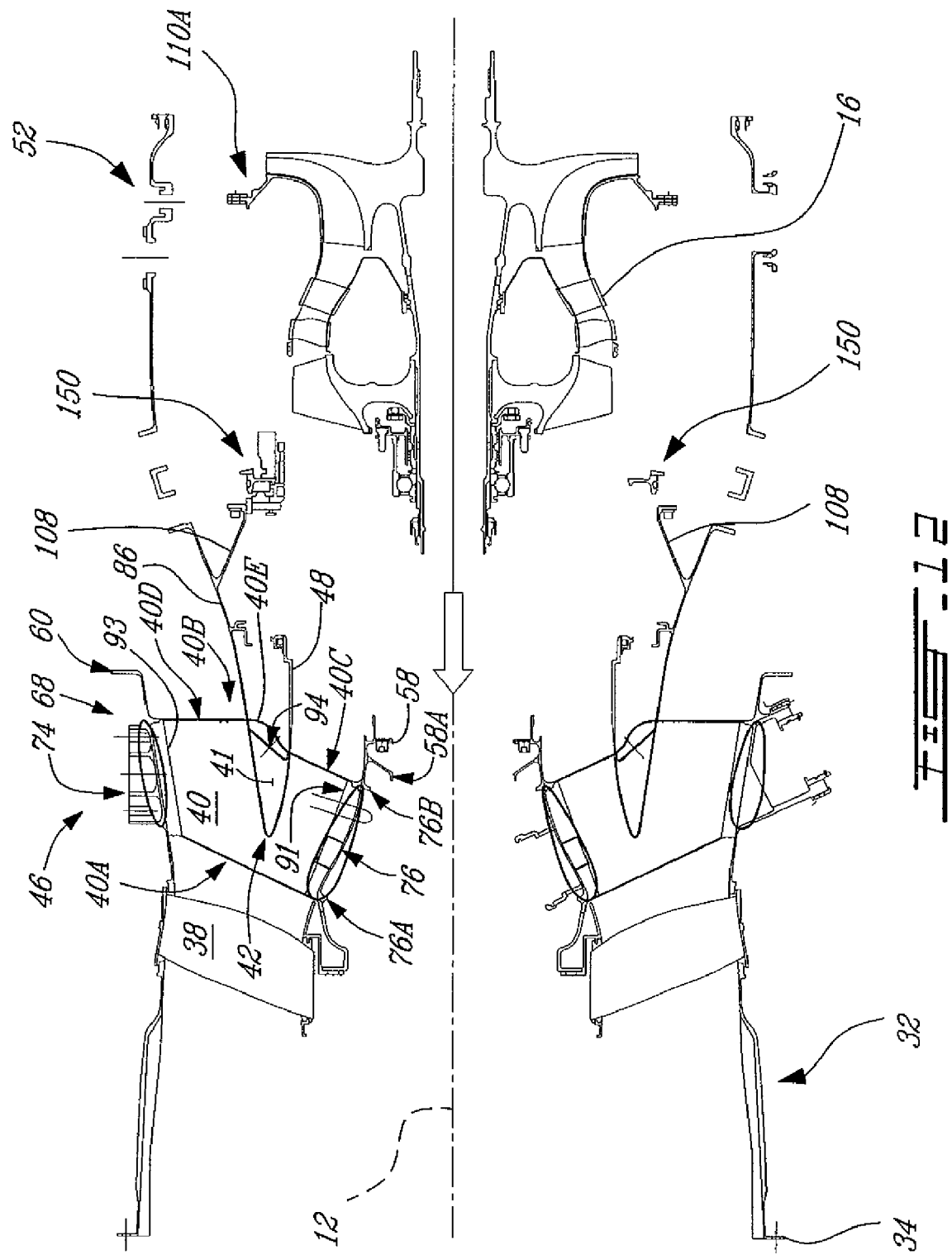
FIG. 12 is a somewhat schematic cross-sectional view showing assembly steps according to the present invention.

The gas generator case portion 52 of casing 32, includes an upstream section 104 and a substantially cylindrical downstream section 106 which are integrated together, preferably by being fabricated in a single manufacturing process. An integral inner ring 108 is disposed within the upstream section 104 and is integrated, preferably by welding, with the gas generator case 52 at the forward end thereof. A mounting flange 110 extends radially outwardly from the inner ring 108 at the inner edge thereof, for securing the diffuser 18 flange 110A and bleed valve 150 thereto (see (FIGS. 3, 4 and 12). A number of openings 140 (see FIG. 6) are provided in the gas generator case 52 for receiving or mounting engine components of the gas generator portion, such as fuel injecting means 30, and so on, as will be understood by one skilled in the art. The downstream cylindrical section 106 has an aft end 107 which is integrated with a radially outwardly extending mounting flange 112, for connection with turbine and/or exhaust case 54. The gas generator case 52 is integrated at the front end thereof with the aft end 89 of the annular outer wall 86 splitter 42 of the intermediate portion 46 at 134, also preferably by welding.

The fan portion 44, the intermediate portion 46 and the gas generator portion 52 of casing 32 are thus fabricated separately, for example by machining from solid, sheet metal fabrication, forging, casting, flow-forming, etc., depending on the design of each and the wishes of the designer. The separately fabricated cases are then integrally attached preferably by welding. It is then preferable to finally machine the interior portions of the integrated casing 32 prior to installation of rotor assemblies, in order to reduce any tolerance stack-up occurring during casing 32 manufacture or assembly. This dramatically reduces the tolerance stack-up over prior art devices.

The way in which each portion is formed and the exact means by which the portions are attached are not critical to the invention, but rather may be left to the designer's discretion. Therefore, the present invention allows for flexibility in selection of manufacturing processes to meet the designer's needs in providing an integrated case assembly for a very small turbofan engine. The present invention thereby permits a variety of manufacturing techniques, notably among them fabrication techniques such as machining from solid, flow-forming and sheet metal construction, which are not available with prior art casing designs.

In yet another aspect of the present invention, the flexibility of manufacture permitted by the present invention permits the bearing mounts integrally provided in the case to be much simpler, in terms of part count, than prior art bearing mounts. Typical prior art gas turbine engines require complicated bearing mounts, including assemblies known as "squirrel cages" to dampen vibrations caused by rotor imbalances which inevitably result despite highly accurate machining processes. In the present invention however, bearing mounts such as bearing mount 58 may be provided with an integrated flexibility, such that which is a function of its material, configuration, stiffness, etc., such that bearing mount 58 itself can be "tuned" during manufacture to thereby obviate the need for a squirrel cage. The bearing mount 58 is thus integrally designed and provided to also perform a damping function to remove the need for separate squirrel cage assemblies. Since squirrel cages add weight, length and complexity to the engine, deleting this component is of course valuable and therefore yet another beneficial feature of the present invention.

Referring now to FIGS. 5, 6 and 12, in a yet further aspect of the present invention, a method for assembling a turbofan engine will now be described. Unlike the prior art, the present invention casing 32 is preferably fully (or substantially) assembled before any rotating or other gas turbine components are assembled therein. Thus, the first step is making and assembling the components of the casing assembly 32, as described above. The next step, also described above, preferably is to machine internal surfaces of the casing 32, such as surfaces relating to bearing mounts, compressor shrouds and similar surfaces, to remove any accumulated tolerance stack-up which would affect the efficient operation of the engine. The next steps are to insert the fan rotor assembly 13 inside casing 32 (step not shown in the Figures), preferably through the inlet 34 of the casing assembly 32 and into the fan portion 44, and to insert the bleed valve 150 and compressor assembly 16 into casing 32, preferably through gas generator portion 52 (see FIG. 12). The diffuser 18, combustor 20, the turbine assemblies, and other components are also inserted into casing 32, also preferably from the aft end of the gas generator portion 52. The assembly process of the engine 10 is then completed by further mounting the turbine and exhaust case 54, the bypass duct 56, and other engine components in and to the casing assembly 32. While the specific order of insertion and assembly of these interior assemblies in casing may depend on preference or the design layout of engine 10, the present invention involves building the core of engine 10 inside a completed or substantially completed casing 32, thereby permitting an overall more efficient assembly technique for the gas turbine engine.

The present method also advantageously provides a fast assembly of a gas turbine engine because no fixtures such as flange connections are required and therefore, less "final" assembly steps are required.

As mentioned, the present invention has particular application for use in so-called very small gas turbine engines, namely engines typically 2000 pounds thrust and below for use in general aviation aircraft sometimes referred to as "personal" jet aircraft. This market represents a leading edge of gas turbine turbofan technology, wherein the limits of scaling and cost-effective design and operation are challenged. Prior art small turbines, such as those used in missile engines are simply unsuitable. Missile engines are invariably expensive to make and operate (owing to their military-heritage), and are designed for extremely short operational lives (a few hours) in which they are continuously operated at full thrust. The very small turbofan as contemplated herein, however, must of course be operated intermittently at varying thrust levels (e.g. idle, taxi, take-off, climb, cruise, approach and landing) for thousands of hours, not to mention be affordable and quiet to operate and environmentally friendly. Likewise, although microturbines are beginning to proliferate in the power generation field, this technology is also largely unsuitable since aircraft applications require extremely lightweight and reliable designs which are typically not found in industrial microturbine designs. Accordingly, the present invention represents an advance in the field of providing an affordable-to-operate turbofan to general aviation pilots.

Figure 7:
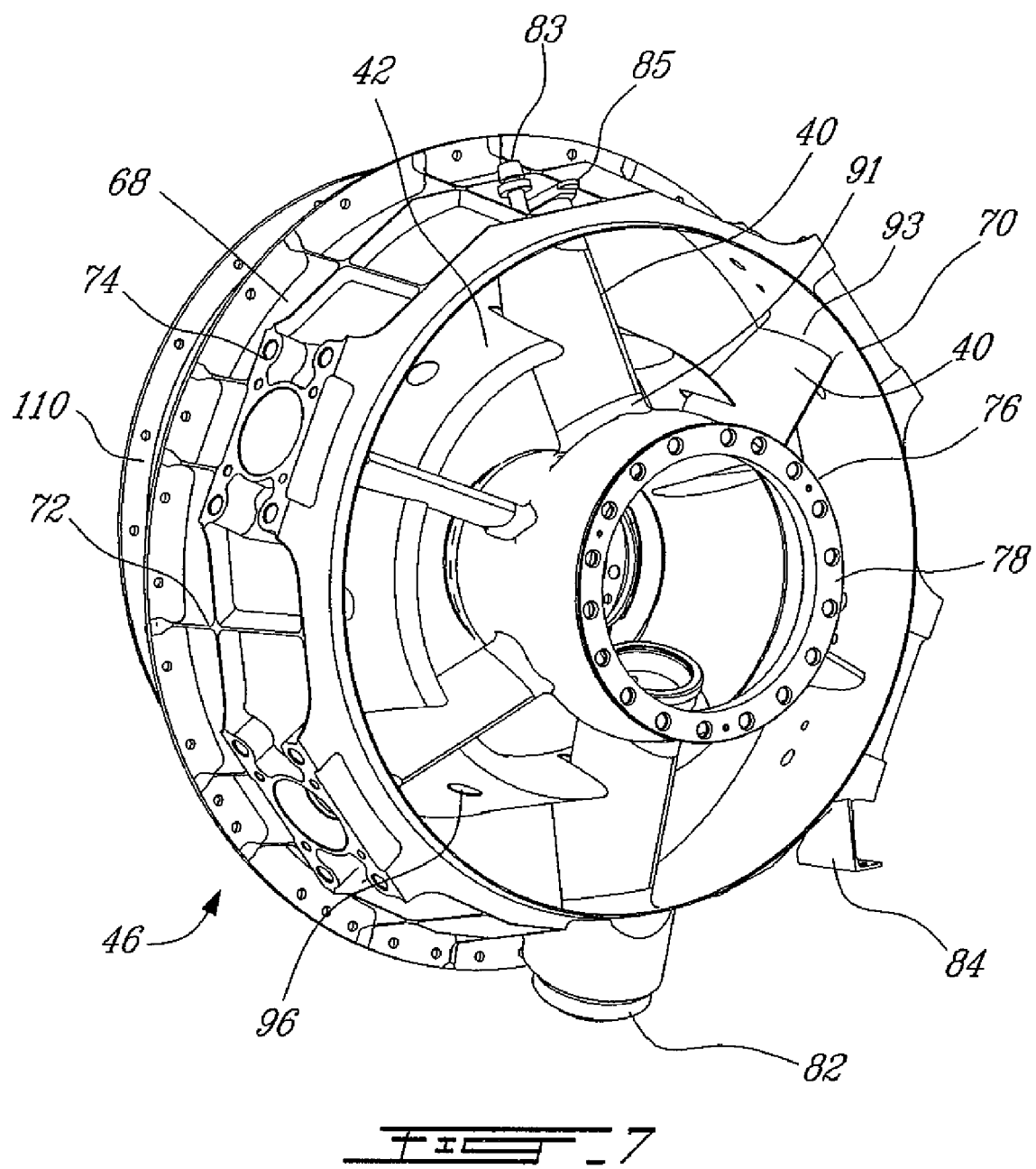
FIG. 7 is an isometric front view of the intercase portion shown in FIGS. 5 and 6.
Figure 8:
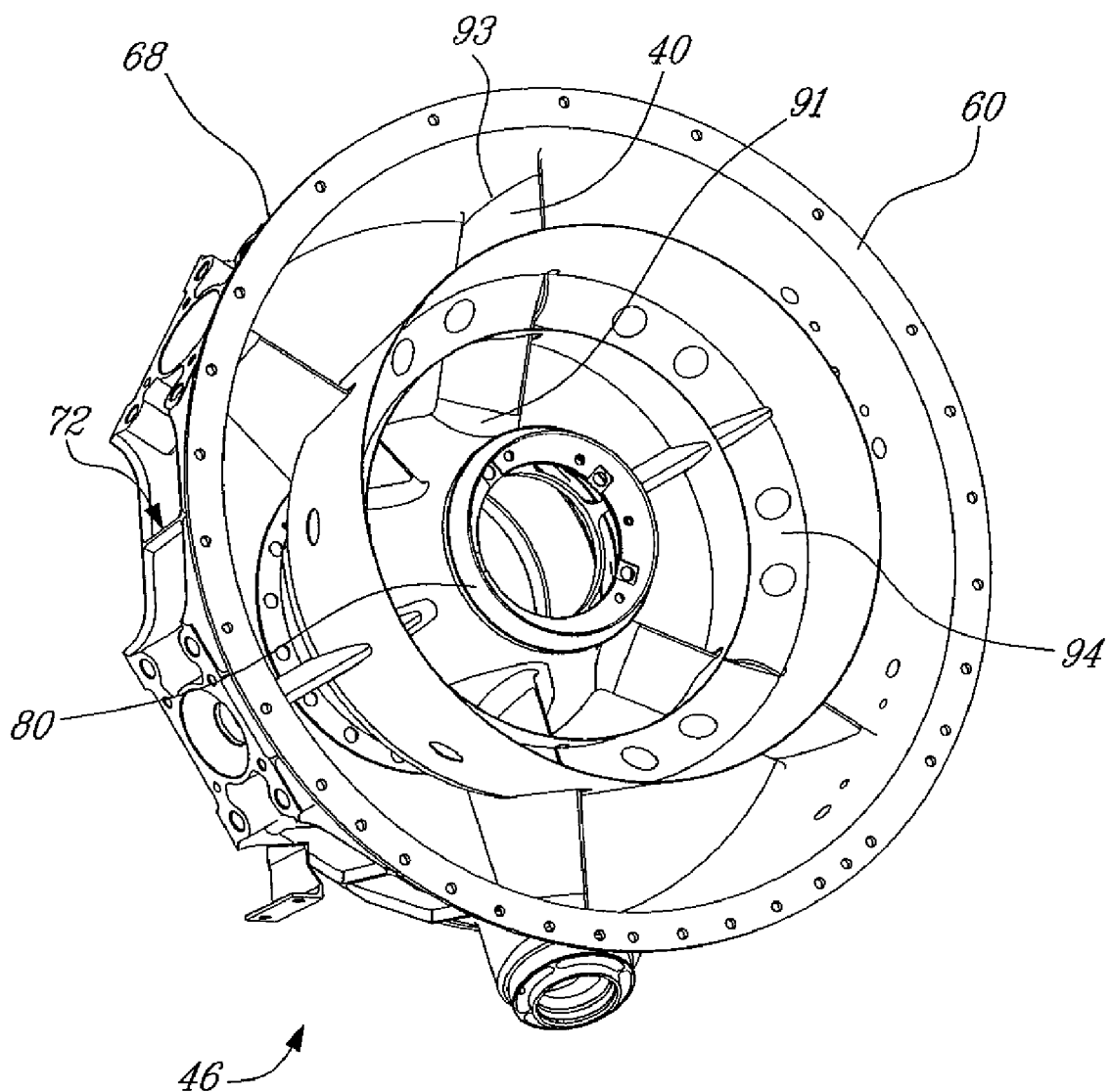
FIG. 8 is an isometric rear view of the intercase portion shown in FIGS. 5-7.

The present invention permits a turbofan casing to be provided which, in the very small turbofan size range, permits the overall weight of the casing to be reduced over conventional larger designs. The weight reduction is due in part to the thin shell stiffened semi-monocoque design of the intermediate case section 46, which has an integrally-stiffened thin shell construction which allows the designer to optimize the use of metal to thereby reduce weight. Referring again to FIGS. 5, 6 and 7, the thin "sheet" outer ring "panels" 68B are reinforced at specific locations by the ribs 72 and struts 40, and by engine mounts 74 and other similar features on the ring 68, to balance external loading by compression and tension in the reinforcing members reacting balanced shear in the "panels" 68B of the outer ring 68. This provides a stable structure with a stiffness comparable to a cast structure more than 500% thicker. It is through this approach, combined with the simplicity of attachment, that the overall weight of the casing is significantly reduced.

Referring again to FIGS. 5 6 and 7, as described above, outer ring 68 has a thin-walled semi-monocoque design includes a plurality of ribs 72 extending axially and circumferentially about the outer ring 68 to thereby define a plurality of thin-shell panels 68B therebetween. The axial and circumferential arrangement of ribs 72 provides panels 68B with a generally rectangular shape and the ribs being more or less parallel or perpendicular to one another. A partial top view of outer ring 68 is shown in FIG. 14, showing ribs 72 and thin-shell panels 68B.

The splitter 42 separates core flow passage 36 from bypass flow passage 37, and is supported by. Each strut 40 extends from a leading edge 40A to trailing edge 40B, the trailing edge having a bent, kinked or discontinuous profile having an inner portion 40C and an outer portion 40D joined by a bend or kink 40E. Each strut 40 extends from an inner end to an outer end (not indicated) to meet with and connect to bosses 93 and 91, respectively, integrally provided on inner and outer rings.

Figure 13:
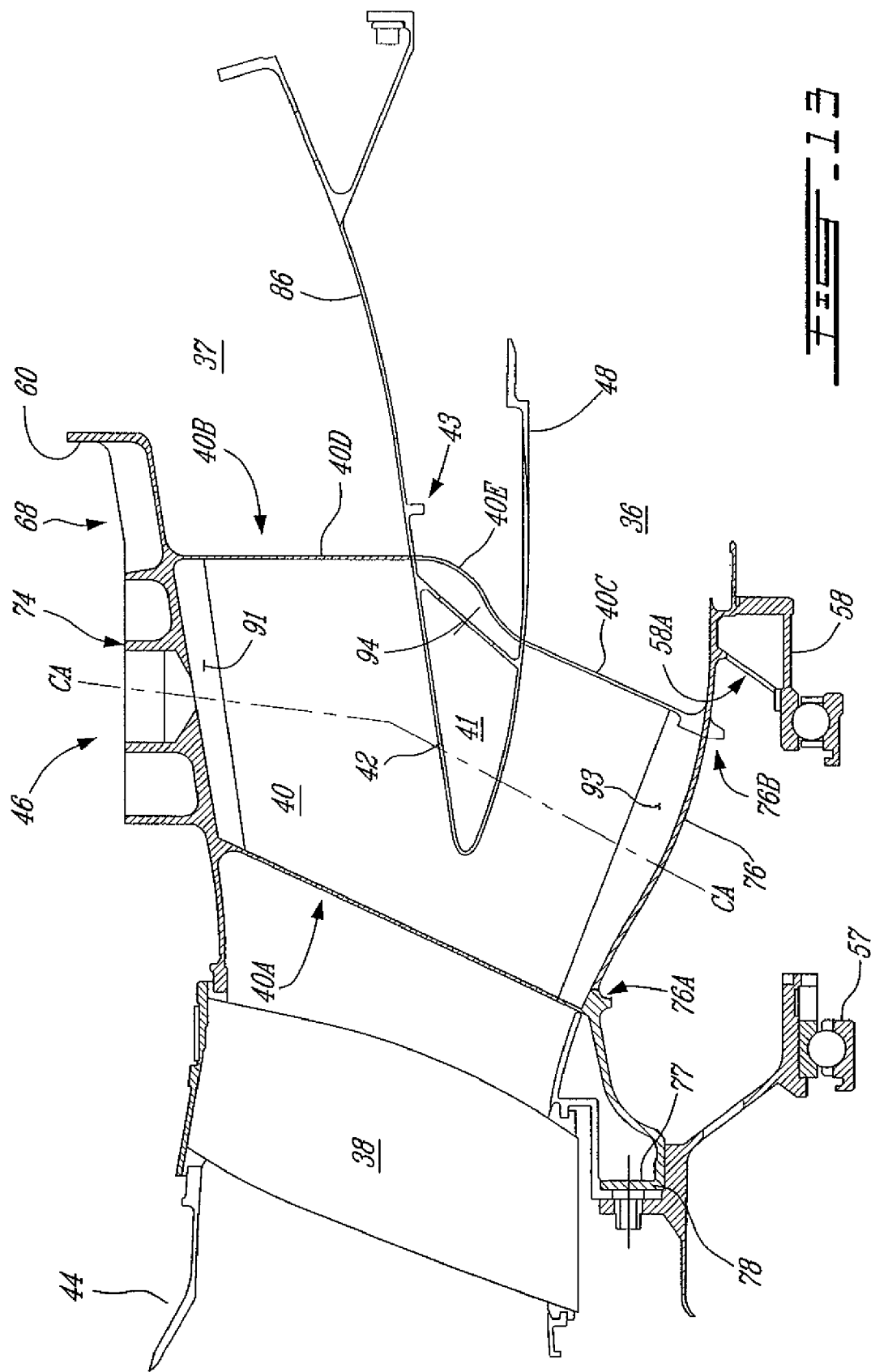
FIG. 13 is an enlarged view of a portion of FIG. 12.

Referring now to FIG. 13, the splitter 42 is joined to the strut 40 and includes the internal web 94 (see also FIGS. 3-5), which co-operates with struts 40 and splitter 42 to thereby define a plurality of closed-section hollow torque boxes 41 between adjacent struts 40 (see also FIG. 15). In the example engine depicted in FIG. 15, therefore, since there are six struts there are six torque boxes 41 formed therebetween. Struts 40, splitter 42 and web 94 are joined to one another by shear-transmitting joints (e.g. welded, brazed, or other bonded joint, or have an integral construction and hence not be "joints" per se). The joints (indicated by 42A and 94A in FIG. 16a) are preferably strong enough provide the necessary shear connections to prevent deformation of the torque boxes under anticipated loadings, as will be described below. These torque boxes provide the mechanism for transferring the bending moments associated with the weight of the engine core transferred from the gas generator case to the splitter (see FIGS. 3, 4, and 6, for example).

The splitter 42 preferably further includes a circumferential stiffening ring 43 slightly aft of torque box 41. Similarly, the inner hub 76 preferably includes a pair of circumferential stiffening rings 76A, and 76B, respectively, on an interior side thereof, and preferably axially positioned to correspond to the locations at which struts 40, boss 91 meet inner hub 76. The Inner hub 76 supports the main low spool thrust bearings at bearings 57 and also includes a bearing attachment seat 58 and a bearing bumper 58A, as will be described in more detail below.

Mounts 74 are preferably positioned relative to struts 40 such that mounts 74 are substantially aligned with a centroidal axis "CA" (see FIG. 13) of strut 40 to thereby significantly reduce any tendency for loads to cause strut bending relative to the mounts 74. The 'centroidal axis' will be understood to mean a line passing through the centroids of all axial sections of a strut 40 (i.e. will pass through the centroid of any horizontal section of the strut 40, as viewed in FIG. 13).

As mentioned above, outer ring 68, which is a semi-monocoque structure composed of thin-shell shear panels 68B, and axial and circumferential stiffeners 72, is thus analogous to conventional aircraft fuselage turned inside-out. The loads applied to the structure are reacted as either tension or compression (depending on the direction of the source load) in the ribs 72, which are internally balanced by opposing shears in the panels 68A. Stresses are thus shared amongst adjacent ribs 72, and bending forces are avoided by resolution to in-plane tensile and compressive forces and shear. This manner of reacting loads in shear gives the intermediate case portion 46 a relatively high structural efficiency and stiffness compared to a typical prior art cast engine case. In the design described, engine mounts 74 and strut bosses 93 also act as tensile/compressive load bearing members communicating with adjacent shear panels. Loads thus enter the outer ring 68 via the struts 40/bosses 93, and are passed through the semi-monocoque structure or ribs and shear panels to the engine mounts 74, for ultimate transmission to the aircraft. Since out-of-plane bending forces are resolved into in-plane compressive/tensile loads, the think prior art case sections are not required as bending is no longer reacted merely by the casing section in plate bending. The result is a casing which is significantly lighter than the prior art, particularly when high modulus materials are used, such as steel. Although the ribs & panel configuration shown in FIG. 14 is preferred, the grid need not be regular nor rectangular, but rather any effective configuration preferred by the designer may be used.

Similar to outer ring 68, inner hub 76 is also provided with a semi-monocoque structure, as follows. Stiffener rings 76A and 76B and strut bosses 91 co-operate to divide the annular surface of hub 76 into a plurality of thin-shell shear panels 76C which react to tensile or compressive loads in rings 76A, 76B and strut bosses 91 as a shear in panels 76C, as depicted in FIG. 17, to thereby balance the structure. In this manner, bending in the inner hub is minimized such that the panels 76C may be substantially thinner than the prior art (e.g. the present invention may have panels of 0.050" or less). A bearing bumper 58A may also be provided to reduce bending, as is described further below.

In use, bearing loads exerted on inner hub 76 are transferred to outer ring 68 via struts 40, as follows. In general, bearing loads generated by engine thrust and transient dynamic events, such as blade-off events or bird strikes, are experienced mainly at bearing set 57 (bearing 58 typically contributes little additional loading in such events) which are passed into the inner hub 76 at its leading edge. The inner hub, with its semi-monocoque design, reacts to the applied loads internally as tension/compression and shear, as described above. The bearing load is passed mainly through the leading edge 40A of the strut 40 in compression or tension to the mount pads 74. For reasons described below, the mount pads 74 are located at (or near) the centroidal axis CA of the strut 40 cross-section.

In use, engine inertia loads are also exerted on the splitter 42 by the remainder of the engine connected thereto via the gas generator case, and these are transferred to outer ring 68 via struts 40. In general, engine inertia loads enter the intermediate case 46 via the splitter (to which the gas generator case is attached) and are reacted in the rear outer portion 40D of the strut 40 as a compression or tensile load. These loads tend to bend the strut and torque box and thus are reacted into the structure of strut 40 by the reaction of torque box 41 converting the load into a shear which stiffener 94 transmits as a tension or compression into the rear of the strut. The torque boxes 41 will now be described in more detail.

The torque boxes 41 are hollow closed cells formed between the struts 40, splitter 42, and stiffener 94. As will become apparent below, torque boxes 41 are somewhat similar in purpose and function to the torque box present in an aircraft wing, although here the construction is analogous to an aircraft wing wrapped into a cylinder. The rear stiffener web 94, it will be seen, is analogous to the spar of this cylindrical wing. The torque boxes 41 "convert" loads applied to one or more struts (for example, a bending moment and a transverse shear) into a balanced shear flow in the cell, which may then be "communicated" to and reacted by adjacent struts, as will now be described.

Referring to FIGS. 15, 16a and 16b, a load, such as a bending moment, in one direction on one strut 40 will be communicated by the torque boxes 41' to the two adjacent struts 40', which will in turn of course react the force, thus tending reduce the effect of the applied load on the first strut by transferring a reactionary component to the adjacent struts. In this manner load sharing is achieved. (Though only the interaction of three struts is shown in FIG. 16b for description purposes, it will be understood that struts 40' likewise communicate external and internal loads to their adjacent neighbors via their respective torque boxes, and thus external and internal loads are thus redistributed around the structure among the struts 40.) Referring still to FIG. 16a, and as will be discussed in more detail below, a torsional load applied to torque box 41 (represented by the circular stippled arrow), such as that applied by the weight/inertia of the gas generator attached to the splitter, is also reacted by the torque box 41, in this case preferably mostly as a shear force, which is passed to strut 40 as an in-plane load at least partially by a shear (represented by the straight stippled arrow) passed through the shear transmitting joint 94A from web 94 to strut 40. The stiffener ring 43 helps to distribute the inertia loads more uniformly to the torque boxes 41. The torque box arrangement and structure therefore both helps distribute loads among adjacent struts as well as convert torsional and bending loads into shear, which can then be transmitted as substantially pure (preferably) compression or tension in struts 40.

Therefore, since the struts are inherently connected, any tendency for displacement of one strut is inherently reacted and balanced through the torque boxes by adjacent struts, which not only redistributes the load but also substantially reduces the amount of bending forces on the struts, even during transient dynamic events such as bird strikes. This significant reduction of bending forces which permits the use of thin-walled structures of the struts of the present invention, since the absence of plate bending permits substantial reduction in cross-sectional thickness in the casing and struts relative to the prior art.

Referring still to FIG. 16a, the in-plane loads transferred from torque box 41 to strut 40 will thus load the aft portion 40D of the strut 40 in tension or compression (depending on load direction) and this internal tensile or compressive load is then carried by the aft portion 40D of the strut 40 to the outer ring 68 and ultimately the engine mount 74. The shape of the strut 40 is used to divide the bearing loads from the inertia loads. In particular, the bend or kink 40E in the aft portion 40B of the strut 40 reduces the axial stiffness of the strut 40 which thus creates two separate load paths for the loads generated in the engine (i.e. one for bearing loads and one for inertia loads, as described above). The kinked shape of the strut 40 interrupts the load path to the inner hub, which thereby impedes the transfer of loads from the splitter to the hub. This simplifies load transfer as will as beneficially reducing bending on the strut, which thereby permits a thin-walled strut structure to be employed. Referring to FIGS. 18a and 18b, since prior art struts were required to react bending forces transmitted thereto, the prior art struts required thick enough sections (FIG. 18b) to provide the appropriate bending strength. In the present invention, however, the reduction, or more preferably negation, of bending of strut 40 permits the use of sheet metal struts (FIG. 18a) which are of course much lighter than the prior art.

As described above, the engine mounts are preferably positioned along (or as close as is possible) the centroidal axis, thereby negating (or reducing to a manageable level) the bending moment applied to intermediate case 46 as a result of the tensile/compressive loads passed to the intermediate case 46 from struts 40. In this manner, bending is reduced on intermediate case 46 and struts 40, further enhancing the opportunity to make full advantage of the semi-monocoque and thin-walled design of the case and struts to thereby maximize structural efficiency and minimize weight. The structural efficiency of the semi-monocoque structure of the inner hub 76 and outer ring 68 is thereby improved and enhance by the use of the struts 40 of the present invention, and although these components may be employed individually with advantage, the use of two or more, and preferably all three together provides yet further advantages and benefit by the intrinsic co-operation therebetween which may be obtained.

It should be noted that, as described above, the balanced shear flow, induced in the torque boxes 41 as a result of a torsional load, is reacted by the struts 40 predominantly as shear load at the splitter/strut joints (42A, 94A). Thus, there is a substantial absence of tensile loads at these joints, which advantageously permits the use of fillet welds to provide joints 42A, 94A. Also, due to the relatively long length of these joints, and loading sharing among the plurality of joints in the overall structure (i.e. on the plurality of torque boxes), the shear stresses on the joints are relatively low, thus further allowing a reduction of the thickness the strut and torque box cross-section. Very thin gauges of sheet metal may thus be used.

Advantageously, the struts may be designed to act as a load "fuse" limiting the allowable load transmitted to the mount by their compressive capability. (It will be understood that when a sufficient compressive load is applied to the thin-walled strut, the strut will collapse). For example, the strut may be designed to collapse when a certain threshold load is experienced (e.g. a significant big strike) to thereby limit the amount of load (and therefore damage) which is transferred to the aircraft in such an event. In this example taken in the context of the preferred embodiment above, when the threshold bearing load is applied by the inner hub to the strut, the leading edge is designed (i.e. by virtue of its thickness, etc.) to collapse under such event loads, thereby absorbing energy by plastic deformation rather than transferring it to the engine mounts and aircraft. In design, the maximum allowable load to be transferred by the strut would be determined, and then a strut configuration is determined that would collapse or otherwise structurally fail upon the application of this maximum load, or a larger load, and thereby limit the load transfer to the engine mounts.

Referring again to FIG. 13, the bearing bumper 58A can be provided to assist in improving the stiffness of inner hub 76. For example, sizable asymmetric bearing loads are applied to inner hub 76 during medium-sized bird strike events, for example, which tend to cause bending in the engine shafts, which tend to distort the bearing housing, and thus bearing seat 58. The bumper 58A is a leg or stop-type device which is provided with a small clearance (not shown, as the scale of FIG. 13. is too small to indicate this feature) between the bumper 58A and the bearing seat 58 (or bearing or other appropriate surface). The clearance preferably corresponds to the amount of allowable deflection desired in such an event (e.g. 0.005", for example). If a larger deflection is forced, the bumper will assist the bearing seat 58 (or whatever surface is opposed by bumper 58A) to resist such deflection. This simple device therefore permits the rear portion of the inner hub 76 (i.e. the portion supporting the bearing seat 58) to be substantially thinner, since the inner hub 76 thickness does not need to react these bending forces and deflections alone. This therefore also helps unload the bottom and rear portion of the strut 40, so that the inner hub 76 and bearing seat 58 can be thinner, and weigh less.

Although the individual weight savings achieved by each aspect of the present invention may be insubstantial when considering larger turbofan engines, in the case of very small turbofan engines (e.g. 2000 pounds thrust and under), these accumulations of small weight savings result in a significant weight savings.

The invention provides a multi-faceted structure which seeks to force out-of-plane loads (e.g. bending loads) back into plane, and balances tensile and compressive loads with shear panels to thereby create equal and opposite shear flows in adjacent panels.

In this application, "thin wall" means sheet metal type thickness, wherein "thin" is interpreted relative to the applied loads, such that the thin wall is substantially incapable of reacting applied bending forces in plate bending.

While the above description addresses the preferred embodiments, it will be appreciated that the present invention is susceptible to modification and change without departing from the scope of the accompanying claims. For example, while described in respect of an application to very small turbofan engines, some benefits may be attained in larger turbofan or other gas turbine engines in applying the principles of the present invention. Though the use of certain materials and manufacturing methods have been disclosed as preferred, other materials and methods may be substituted without departing from the present invention. The cases need not be integrated as described to achieve benefits of the present invention. Likewise the struts need not necessarily be hollow in all embodiments, nor need they comprise a single "cell" as described above, but may have multiple cells defined therein (see FIG. 19). As shown in FIG. 16c, the torque box may comprise more cells. The torque box need not be comprised of the splitter itself, but may be an additional structure which may be inside the splitter, or elsewhere. Although a single strut is preferred for transfer of both bearing and inertia loads, multiple struts (e.g. an upstream and downstream strut pair) may be sued). The semi-monocoque shear panels in ring 68 and hub 76 need not be rectangular or regularly sized. Still other modifications will be apparent to those skilled in the art which will fall within the scope of the invention intended by the inventors, and the appended claims therefore are not intended to exclude such modifications.

We claim:

1. A casing for an aircraft turbofan bypass engine, the casing comprising:

a thin-walled sheet metal annular case adapted to encircle the engine and having a plurality of engine mounts thereon adapted to mount the engine to an aircraft, airflow through the engine in use defining upstream and downstream directions;

a plurality of thin-walled sheet metal struts connected to an annular leading edge tip of a splitter separating a core flow passage from a bypass flow passage, the struts having a leading edge extending uninterruptedly between an engine bearing support structure and the case, the strut leading edges connected to the engine bearing support structure axially upstream of where the strut leading edges connect to the case thus angling the strut leading edges rearwardly as they extends radially outwardly, the engine bearing support structure disposed inwardly of the core flow passage, the strut leading edges disposed upstream of the splitter leading edge tip such that the strut leading edges provide an uninterrupted primary load path from the engine bearing support structure to the case for transfer of thrust loading from engine bearing support structure to the engine mounts on the case, the struts each having a centroidal axis defined along a locus of centroid positions for a plurality of strut sections along a length of the strut, wherein the engine mounts are axially and circumferentially positioned on the case to substantially correspond with one of said strut centroidal axes to thereby minimize bending loads in the case as a result of thrust loads transferred by the struts to the engine mounts.

2. The casing of claim 1 wherein the case is an intermediate case portion of the casing.

\* \* \* \* \*